(12) United States Patent
Choi et al.

(10) Patent No.: US 9,591,249 B2
(45) Date of Patent: Mar. 7, 2017

(54) METHOD FOR DISPLAYING CONTENTS INFORMATION

(75) Inventors: Go Woon Choi, Pyeongtaek-si (KR); Eun Seon Ahn, Pyeongtaek-si (KR); Jae Uk Kim, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 326 days.

(21) Appl. No.: 12/785,838

(22) Filed: May 24, 2010

(65) Prior Publication Data

US 2011/0119712 A1 May 19, 2011

(30) Foreign Application Priority Data

Nov. 17, 2009 (KR) .................. 10-2009-0110999

(51) Int. Cl.
| | |
|---|---|
| *H04N 5/445* | (2011.01) |
| *H04N 5/44* | (2011.01) |
| *H04N 7/173* | (2011.01) |
| *H04N 21/45* | (2011.01) |
| *H04N 21/475* | (2011.01) |
| *H04N 21/482* | (2011.01) |
| *H04N 21/61* | (2011.01) |
| *H04N 21/422* | (2011.01) |

(Continued)

(52) U.S. Cl.
CPC ......... *H04N 5/4403* (2013.01); *H04N 5/4401* (2013.01); *H04N 5/44543* (2013.01); *H04N 7/17318* (2013.01); *H04N 21/4532* (2013.01); *H04N 21/4755* (2013.01); *H04N 21/482* (2013.01); *H04N 21/4821* (2013.01); *H04N 21/6125* (2013.01); *H04N 21/42204* (2013.01); *H04N 21/4316* (2013.01); *H04N 21/47* (2013.01); *H04N 2005/4428* (2013.01)

(58) Field of Classification Search
USPC ..................................... 725/37–61
See application file for complete search history.

(56) References Cited

U.S. PATENT DOCUMENTS

| | | |
|---|---|---|
| 4,435,086 A | 3/1984 | Kato |
| 5,793,438 A | 8/1998 | Bedard |
| 5,802,492 A | 9/1998 | DeLorme et al. |

(Continued)

FOREIGN PATENT DOCUMENTS

| | | |
|---|---|---|
| CN | 1219322 | 6/1999 |
| CN | 101262668 | 9/2008 |

(Continued)

OTHER PUBLICATIONS

U.S. Office Action issued in U.S. Appl. No. 12/785,815 dated Mar. 15, 2012.

(Continued)

*Primary Examiner* — Hunter B Lonsberry
*Assistant Examiner* — Michael Telan
(74) *Attorney, Agent, or Firm* — KED & Associates LLP

(57) ABSTRACT

A method for displaying contents information is provided. In the method, information on each of a plurality of contents may be displayed, and an image for a favorite group registered with the contents may be displayed in correspondence with the displayed contents information. The favorite group image may be displayed as one of a plurality of images. Further, one of the images may indicate that the contents are registered in two or more favorite groups.

13 Claims, 15 Drawing Sheets

(51) Int. Cl.
*H04N 21/431* (2011.01)
*H04N 21/47* (2011.01)

(56) References Cited

U.S. PATENT DOCUMENTS

| | | | |
|---|---|---|---|
| 5,815,145 A * | 9/1998 | Matthews, III | 725/41 |
| 6,307,573 B1 | 10/2001 | Barros | |
| 6,359,636 B1 | 3/2002 | Schindler et al. | |
| 6,456,334 B1 | 9/2002 | Duhault | |
| 6,481,011 B1 * | 11/2002 | Lemmons | 725/47 |
| 6,493,037 B1 | 12/2002 | Raiyat | 348/564 |
| 6,629,104 B1 * | 9/2003 | Parulski et al. | 382/307 |
| 6,703,947 B1 | 3/2004 | Wallner | |
| 7,751,971 B2 | 7/2010 | Chang et al. | |
| 7,818,116 B1 | 10/2010 | Nesbitt | |
| 7,894,984 B2 | 2/2011 | Rasmussen et al. | |
| 8,490,124 B2 | 7/2013 | Michael et al. | |
| 2001/0029610 A1 * | 10/2001 | Corvin et al. | 725/42 |
| 2001/0054183 A1 * | 12/2001 | Curreri | H04N 21/482 725/56 |
| 2003/0182052 A1 | 9/2003 | DeLorme et al. | |
| 2004/0119759 A1 | 6/2004 | Barros | |
| 2004/0243307 A1 | 12/2004 | Geelen | |
| 2004/0257340 A1 | 12/2004 | Jawerth | |
| 2005/0251331 A1 | 11/2005 | Kreft | |
| 2005/0278386 A1 | 12/2005 | Kelly et al. | |
| 2006/0058952 A1 | 3/2006 | Cooper et al. | |
| 2006/0058953 A1 | 3/2006 | Cooper et al. | |
| 2006/0058961 A1 | 3/2006 | Chappell et al. | |
| 2006/0080031 A1 | 4/2006 | Cooper et al. | |
| 2006/0109145 A1 | 5/2006 | Chen | |
| 2006/0174209 A1 | 8/2006 | Barros | |
| 2006/0230356 A1 | 10/2006 | Sauve et al. | |
| 2006/0253907 A1 | 11/2006 | McConnell | |
| 2007/0050143 A1 | 3/2007 | Jones | |
| 2007/0150834 A1 | 6/2007 | Muller et al. | |
| 2007/0186284 A1 | 8/2007 | McConnell | |
| 2008/0016472 A1 | 1/2008 | Rohlf et al. | |
| 2008/0040678 A1 | 2/2008 | Crump | |
| 2008/0040684 A1 | 2/2008 | Crump | |
| 2008/0074550 A1 | 3/2008 | Park | |
| 2008/0086456 A1 | 4/2008 | Rasanen et al. | |
| 2008/0104513 A1 | 5/2008 | Krogh | |
| 2008/0152297 A1 | 6/2008 | Ubillos | |
| 2008/0172173 A1 | 7/2008 | Chang et al. | |
| 2008/0222677 A1 | 9/2008 | Woo et al. | |
| 2008/0222690 A1 | 9/2008 | Kim | |
| 2008/0295012 A1 | 11/2008 | Sloo et al. | |
| 2009/0015596 A1 | 1/2009 | Fuchs et al. | |
| 2009/0046110 A1 | 2/2009 | Sadler et al. | |
| 2009/0138826 A1 | 5/2009 | Barros | |
| 2009/0158185 A1 | 6/2009 | Lacevic et al. | |
| 2009/0234573 A1 | 9/2009 | Notarantonio | |
| 2010/0017733 A1 | 1/2010 | Barros | |
| 2010/0037167 A1 | 2/2010 | Son et al. | |
| 2010/0075643 A1 | 3/2010 | Cooper et al. | |
| 2010/0095231 A1 | 4/2010 | Marlow | |
| 2010/0115554 A1 | 5/2010 | Drouet et al. | |
| 2010/0162314 A1 * | 6/2010 | Meare | 725/44 |
| 2010/0162343 A1 * | 6/2010 | Roberts et al. | 725/136 |
| 2010/0201879 A1 | 8/2010 | VanDuyn et al. | |
| 2011/0007076 A1 | 1/2011 | Nielsen et al. | |
| 2011/0043539 A1 | 2/2011 | Hiroki | |
| 2011/0055024 A1 | 3/2011 | Shen | |
| 2011/0282542 A9 | 11/2011 | Nielsen et al. | |

FOREIGN PATENT DOCUMENTS

| | | |
|---|---|---|
| JP | 2005-039845 | 2/2005 |
| JP | 2008-131181 | 6/2008 |
| JP | 2008-146241 A | 6/2008 |
| JP | 2008-258894 | 10/2008 |
| KR | 10-2001-0040589 | 6/2000 |
| KR | 10-2006-0022448 | 3/2006 |
| KR | 10-2006-0066352 | 6/2006 |
| KR | 10-0687204 | 2/2007 |
| KR | 10-2008-0007837 | 1/2008 |
| KR | 10-2008-0081182 | 9/2008 |
| KR | 10-2008-0082351 | 9/2008 |
| KR | 10-2008-0109076 | 12/2008 |
| KR | 10-2009-0050577 | 5/2009 |
| KR | 10-2009-0084068 | 8/2009 |
| KR | 10-2009-0096831 | 9/2009 |

OTHER PUBLICATIONS

U.S. Office Action issued in U.S. Appl. No. 12/785,815 dated Jul. 18, 2013.
U.S. Office Action issued in U.S. Appl. No. 12/785,815 dated Mar. 5, 2013.
U.S. Office Action issued in U.S. Appl. No. 12/785,881 dated Dec. 5, 2012.
Chinese Office Action dated Apr. 24, 2014.
U.S. Office Action issued in U.S. Appl. No. 12/785,881 dated Jun. 4, 2014.
European Office Action issued in Application No. 10831702.5 dated Mar. 23, 2015.
U.S. Office Action for U.S. Appl. No. 12/785,881 dated Jan. 2, 2015.
Korean Office Action dated Aug. 28, 2015.
Korean Office Action for Application 10-2009-0110763 dated Oct. 8, 2015.
U.S. Office Act6ion for co-pending U.S. Appl. No. 2/785,881 dated Jul. 29, 2015.
European Search Report dated Jul. 29, 2013.
International Search Report dated Dec. 21, 2010. (PCT/KR2010/002835).
International Search Report dated Dec. 21, 2010. (PCT/KR2010/002868).
International Search Report dated Dec. 24, 2010. (PCT/KR2010/002867).
U.S. Office Action issued in U.S. Appl. No. 12/785,881 dated May 9, 2012.
U.S. Office Action issued in U.S. Appl. No. 12/785,815 dated Aug. 7, 2012.
U.S. Final Office Action issued in U.S. Appl. No. 12/785,881 dated Feb. 11, 2016.
Chinese Search Report dated Oct. 26, 2016 issued in Application No. 2010800521210.

* cited by examiner

Fig.27

| Group | drama | News | Game | Sports |
|---|---|---|---|---|
| Image | ★ | ♠ | ♣ | ◆ |
| Group | User 1 | User 2 | User 3 | User 4 |
| Color | ● | ⊛ | ◍ | ○ |

METHOD FOR DISPLAYING CONTENTS INFORMATION

The present application claims priority under 35 U.S.C. 119 and 35 U.S.C. 365 to Korean Patent Application No. 10-2009-0110999, filed in Korea on Nov. 17, 2009, which is hereby incorporated by reference in its entirety.

BACKGROUND

1. Field

Methods for displaying contents information are disclosed herein.

2. Background

Methods for displaying contents information are known. However, they suffer from various disadvantages.

BRIEF DESCRIPTION OF THE DRAWINGS

Embodiments will be described in detail with reference to the following drawings in which like reference numerals refer to like elements, and wherein:

FIG. 27 is a diagram illustrating an image corresponding to each of favorite groups according to an embodiment.

DETAILED DESCRIPTION

With the development and commercialization of digital TV technology in the conventional analog broadcast, the Internet, as well as the conventional transmission media, connected to each home may be used to provide various contents services, such as real-time broadcasts, COD (Contents On Demand), games, and news to users. An IPTV (Internet Protocol TV) is an example of the contents service based on the Internet. The IPTV may transmit various information services, video contents, and broadcasts through the high-speed Internet to provide the same to televisions of users.

Figure 1:
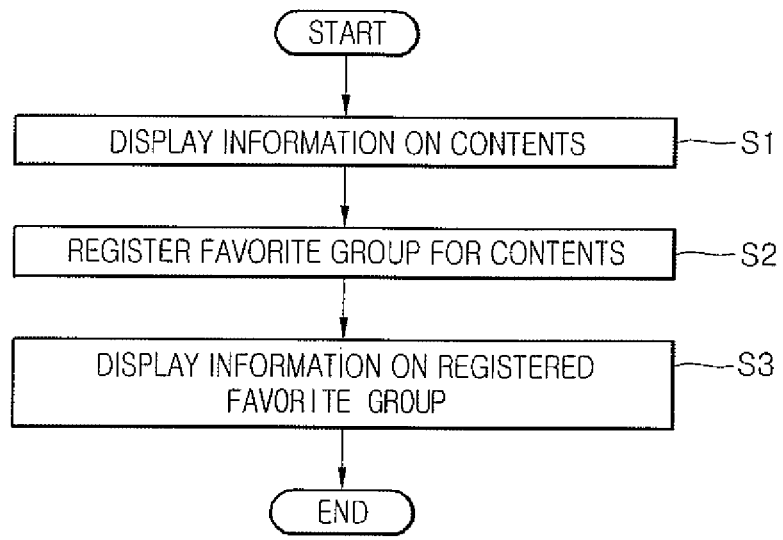
FIG. 1 is a flow chart of a contents information displaying method according to an embodiment.

FIG. 1 is a flow chart of a contents information displaying method according to an embodiment. The contents information displaying method according to this embodiment may be performed by a contents playing device configured to play contents according to external or internal signals. For example, the contents may include videos and audios, and accordingly, the contents information displaying method according to this embodiment may be performed by a display device that includes a display that displays videos and an audio output device that outputs audios. However, the contents information displaying method according to this embodiment is not limited to being performed by a display device, but may also be performed by various other devices, such as mobile phones, smart phones, notebook computers, digital broadcast terminals, personal digital assistants (PDAs), portable multimedia players (PMPs), and navigation devices that can play contents.

Referring to FIG. 1, a contents playing device may display information on a plurality of playable contents, in step S1. The playable contents may include various contents, such as real-time broadcasts, contents on demand (CODs), games, news, and video call services. The contents playing device may use wired/wireless networks, for example, the Internet, to receive signals corresponding to the contents.

There may be a plurality of contents providers corresponding to the respective contents. In this case, at a user's request, the contents playing device, for example, a display device, may access the contents providers to receive various contents, for example, real-time broadcasts, CODs, games, videos, pictures, weather information, news, and video call services, from the contents providers.

Also, in step S1, the contents playing device may display information on the contents on a screen in the shape of characters and images. For example, the displayed contents information may be characters including contents-related information, such as tides, identification (ID) numbers, providers, and content of the contents, or may be images representing the contents. The contents information may include information that enables the user to identify the respective contents and detect the respective contents in brief.

Figure 2:
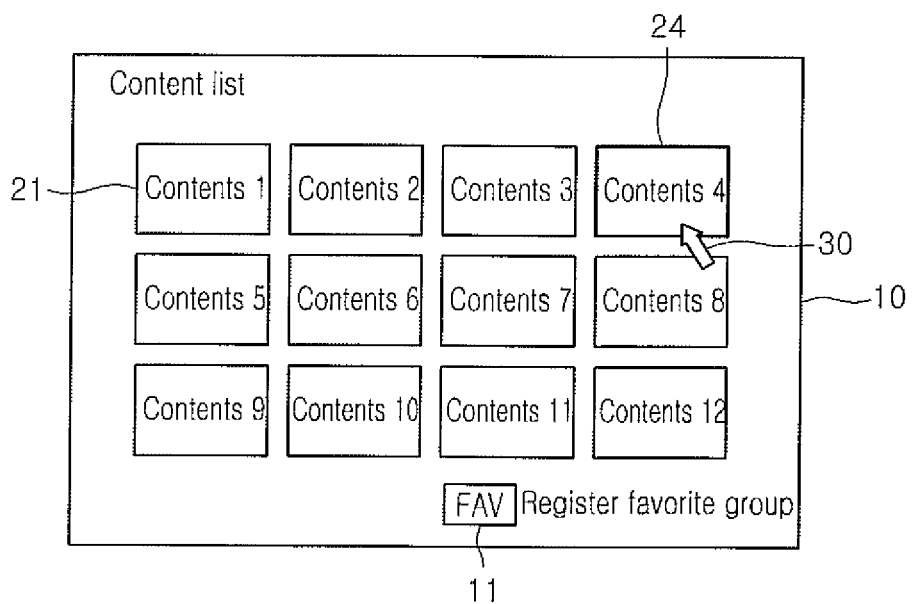
FIG. 2 is a diagram illustrating a method for displaying information on a plurality of contents according to an embodiment.

FIG. 2 is a diagram illustrating a method for displaying information on a plurality of contents according to an embodiment. Referring to FIG. 2, information on playable contents, that is, first to twelfth contents may be displayed on a screen 10. For example, the contents information may be thumbnail images of respective contents videos. The contents playing device may register a contents favorite group, step S2 of FIG. 1. Contents may be registered in at least one of a plurality of favorite groups according to a user's input. The favorite groups may be preset in the contents playing device or may include one or more favorite group added by the user. Further, the favorite groups may be divided according to characteristics of contents, for example, types, content, providers, and users of the contents.

According to one embodiment, the favorite groups may be divided according to the types of the contents. More specifically, the favorite groups may include at least two groups, such as drama, sports, news, movie, video, picture, weather, economy, game, real-time broadcast, and video call.

If the type of contents is drama, the user may register the contents in a 'drama' group among the favorite groups. Other contents may also be registered in corresponding favorite groups according to type. By registering the contents in the corresponding favorite groups, the user may easily detect the type or content of various playable contents and may easily manage and play the contents by group.

According to one embodiment, contents may be registered in two or more favorite groups. That is, if contents have characteristics corresponding to two or more of the favorite groups, the contents may be registered in the two or more favorite groups. For example, if the type of contents belongs to both news and economy, the user may register the contents in both a 'news' group and an 'economy' group among the plurality of favorite groups.

Also, the type of contents provided in a broadcast channel may vary. For example, a drama broadcast and a sports broadcast may be provided in or on one broadcast channel according to time slots. In this case, the user may register the contents of the broadcast in both a 'drama' group and a 'sports' group.

Referring to FIG. 2, the user may select one of the information on contents displayed on the screen 10 and register the contents corresponding to the selected information in a desired favorite group. For example, the user may select the fourth contents information 24 and press a 'FAV' button displayed for registration of a favorite channel, to register the favorite channel of the fourth content.

Meanwhile, the user may perform the above input operation, for example, an operation for selecting specific contents information and an operation for inputting a specific button by using a remote controller connected to the contents playing device in a wired or wireless manner, or by using an object touchable on the screen, for example, the user's finger. For example, the remote controller may be an input device, such as a mouse or a spatial remote controller, that detects a user's gesture or motion and transmit the corresponding signal to the contents playing device.

Also, the contents playing device may have a touch panel that detects a point touched by a specific object or a motion of the touch point of the specific object, to enable the user to perform the above user input operation by touching the screen with his finger or a specific object. According to one embodiment, as shown in FIG. 2, a pointer 30 that moves in correspondence to a motion of the input device may be displayed on the screen 10 having a plurality of contents information displayed thereon, to indicate a location to which a user points by means of the input device.

That is, by means of the input device, the user may move the pointer 30 on the screen 10 to the fourth contents information 24 and press a specific selection button to select or play the fourth contents. Also, by means of the input device, the user may press a button for registration of a favorite group in order to request registration of the selected contents, for example, the fourth contents.

Figure 3:
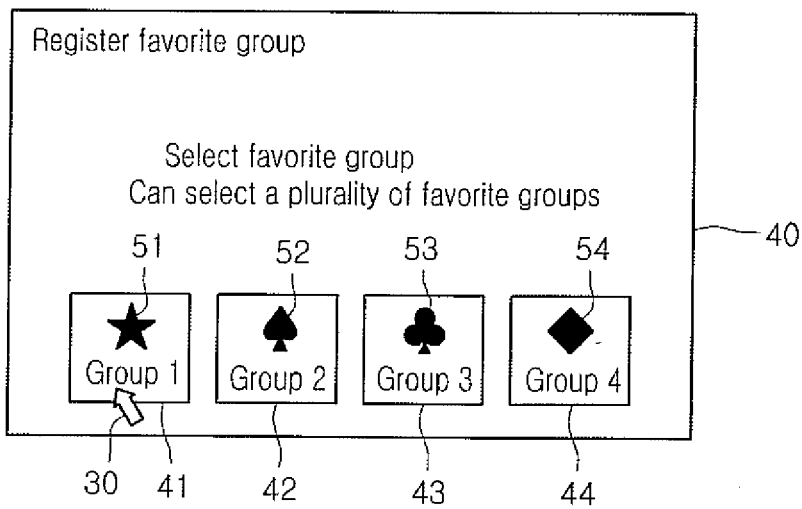
FIG. 3 is a diagram illustrating a method for registering a favorite group for contents according to an embodiment.

FIG. 3 is a diagram illustrating a method for registering a favorite group for contents according to an embodiment. If a user requests the registration of a favorite group for specific contents, a favorite channel registration window 40 may be displayed on a screen 10, as illustrated in FIG. 3. Referring to FIG. 3, the favorite channel registration window 40 may include information on favorite groups capable of contents registration.

For example, information 41 corresponding to group 1 among a plurality of favorite groups, information 42 corresponding to group 2, information 43 corresponding to group 3, and information 44 corresponding to group 4 may be displayed in the favorite channel registration window 40. The information 41, 42, 43, and 44 on the favorite groups displayed in the favorite channel registration window 40 may include, for example, titles, brief descriptions, and/or representative images of the corresponding favorite groups.

The user may detect the information 41, 42, 43, and 44 on the favorite groups displayed in the favorite channel registration window 40 and select/register preference groups corresponding to the respective groups. That is, the user may register the fourth contents selected in one of the groups 1 to 4 displayed in the favorite channel registration window 40. Further, the user may register the fourth contents in two or more of the groups 1 to 4 when necessary.

For example, the groups 1 to 4 may be, respectively, drama, news, game, and sports, and the user may select the group corresponding to the type of the fourth contents to register the favorite group for the fourth contents. More specifically, if the type of the fourth contents is drama, the user may select the group 1 corresponding to the drama among the group information 41, 42, 43 and 44 displayed in the favorite channel registration window 40, to register the same as the favorite group for the fourth contents. The user may move the pointer 30 displayed on the favorite channel registration window 40 to the information 41 corresponding to the group 1 and press a button for registration of a favorite channel, to register the fourth channel in group 1. If the type of the fourth contents is drama and sports, the user may select the group 1 corresponding to drama and the group 4 corresponding to sports, among the group information 41, 42, 43 and 44 displayed on the favorite channel registration window 40, to register the same as the favorite group of the fourth contents. Accordingly, the fourth contents may be registered in two or more favorite groups, that is, the groups 1 and 4.

According to one embodiment, the favorite groups may have respective images. The images corresponding to the favorite groups may be different from each other, and the image may be used to display one of the favorite groups.

Images 51 to 54 corresponding respectively to the favorite groups may be displayed in the favorite channel registration window 40. Referring to FIG. 3, the images 51 to 54 corresponding respectively to the favorite groups may have different shapes so that images of different shapes may be displayed according to the favorite groups. For example, group 1 may be represented by a '★' image 51; group 2 may be represented by a '♠' image 52; group 3 may be represented by a '♣' image 53; and group 4 may be represented by a '♦' image 54.

As described above, a plurality of favorite groups may be displayed using different images, thereby making it possible to provide information on the favorite groups with the registered contents to the user in a limited space and a visually easy manner.

According to the above favorite group registration results, the contents playing device may display information on the favorite groups registered for the respective contents, in step S3 of FIG. 1.

According to one embodiment, an image of the favorite group registered with specific contents may be displayed on the screen 10 in correspondence to information on the corresponding contents, and the favorite group image may be displayed as one of a plurality of preset images. Also, one of the above images may indicate that the contents are registered in two or more favorite groups, so that the user may recognize the contents registered in a plurality of favorite groups, in a visually easy manner.

Figure 4:
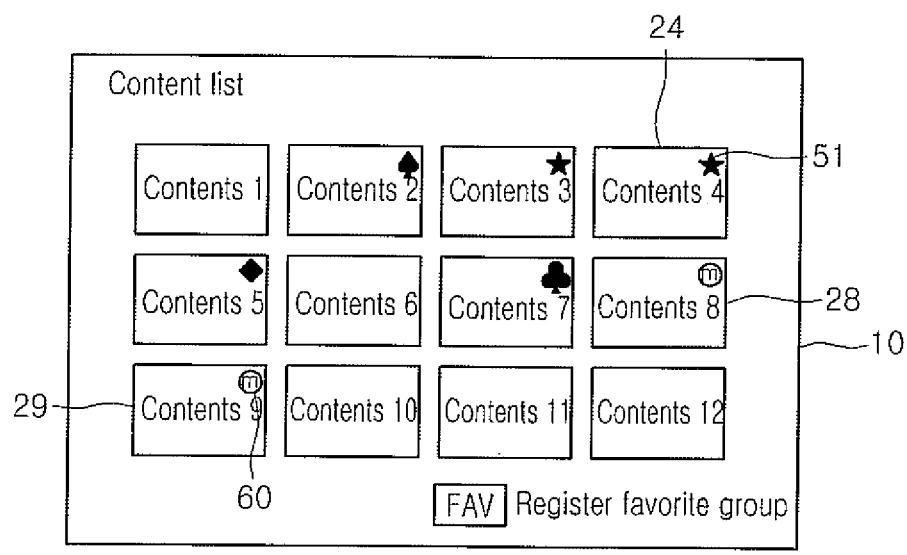
FIGS. 4 to 7 are diagrams illustrating a method for displaying favorite group information on contents according to an embodiment.

FIGS. 4 to 7 are diagrams illustrating a method for displaying favorite group information on contents according to an embodiment. Referring to FIG. 4, images of favorite groups registered for respective contents may be displayed on a screen 10 in correspondence with contents information. For example, the contents information displayed on the screen 10 may include information on the favorite groups with the corresponding contents registered.

As illustrated in FIG. 4, images of favorite groups registered for the contents 2, 3, 4, 5, 7, 8 and 9 among a plurality of contents may be displayed on the screen 10. That is, an image corresponding to the favorite group registered for each of the contents with the registered favorite channel groups may be displayed so that the user may detect the favorite group registered for each of the contents in a visually easy manner.

That is, if the fourth contents are registered in the group 1, the fourth contents information 24 displayed on the screen 10 may include a '★' image 51 corresponding to group 1 registered with the fourth contents, as illustrated in FIG. 4. The '★' image 51 displayed in the fourth contents information 24 enables the user to visually detect that the fourth contents are stored in group 1. From the favorite group information illustrated in FIG. 4, the user may understand that the second contents is registered in group 2, the third and fourth contents are registered in group 1, the fifth contents is registered in group 4, and the seventh contents are registered in group 3.

As described above, the favorite groups may be divided according to characteristics of contents, for example, the types, content, providers, and users of the contents. Therefore, the user may detect the type of each of the contents by means of the favorite group information displayed on the screen 10, so that the user may easily select and play contents of a desired type. For example, if group 1 is drama, the user may detect from the favorite group information displayed on the screen 10 that the third and fourth contents correspond to drama, and may display desired drama contents by selecting one of the third and fourth contents.

At least one of the contents may be registered in two or more favorite groups. According to one embodiment, if specific contents are registered in two or more favorite groups, the favorite group information on the contents may display an image 60 indicating registration in a plurality of favorite groups. The image 60 which may indicate the registration in the plurality of favorite groups, may be different from the images 51 to 54 corresponding, respectively, to the plurality of favorite groups, so that the user may detect, in an intuitively easy manner, that the corresponding contents are registered in two or more favorite groups.

Referring to FIG. 4, each of the eight and ninth contents is registered in two or more favorite groups, and the image 60 may be displayed in the eighth contents information 28 and the ninth contents information 29 to indicate the registration of a plurality of favorite groups. In order to indicate registration in a plurality of favorite groups, an '(m)' image 60 may be displayed in the eighth contents information 28 and also in the ninth contents information 29. If a user selects the image 60, information on two or more favorite groups registered with the corresponding contents may be displayed on the screen 10.

Figure 5:
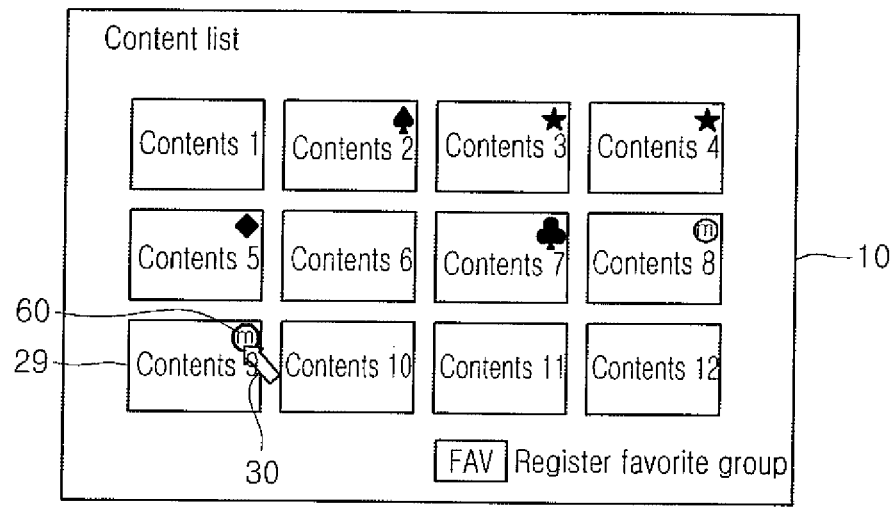
Figure 6:
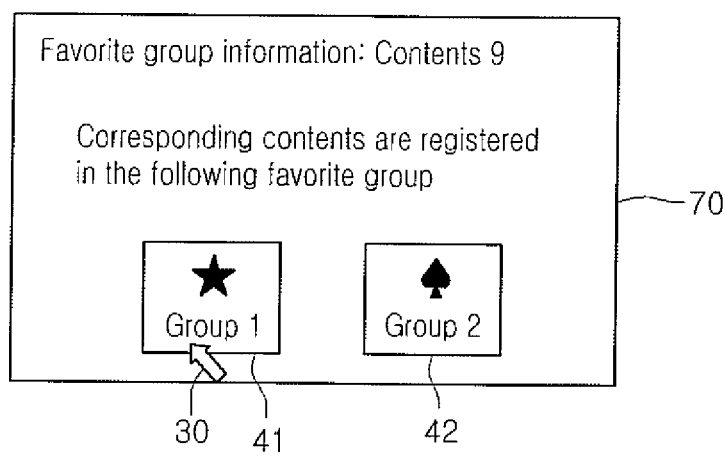

For example, as illustrated in FIG. 5, the user may use the input device to move the pointer 30 to select the image 60 displayed in the ninth contents information 29. As illustrated in FIG. 6, a favorite group information window 70 representing information on the favorite groups registered with the ninth contents may be displayed on the screen 10.

Referring to FIG. 6, information 41 and 42 on the favorite groups registered with the ninth contents, that is, groups 1 and 2, may be displayed in the favorite group information window 70. The favorite group information displayed in the favorite group information window 70 may include a title of the corresponding group and corresponding image(s). For example, if groups 1 and 2 are, respectively, drama and news, the user may understand from the favorite group information window 70 that the ninth contents includes drama and news.

The user may select a desired favorite group by using the favorite group information displayed in the favorite group information window 70. Referring to FIG. 6, the user may select one of the favorite groups, for example, groups 1 and 2, registered with the ninth contents on the favorite group information window 70, and information on the contents registered in the selected favorite group may be displayed on the screen 10. For example, if the user selects group 1 on the favorite group information window 70, one or more contents registered in group 1 may be displayed on the screen 10.

Figure 7:
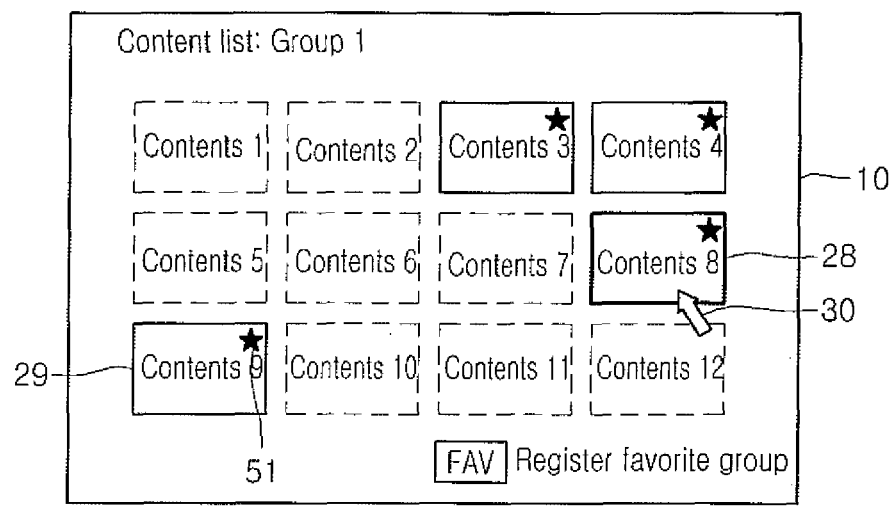

Referring to FIG. 7, information on the contents registered in group 1, that is, the contents 3, 4, 8 and 9 may be displayed in an active state on the screen 10, and information on other contents not registered in group 1 may be displayed in an inactive state on the screen 10. Also, a '★' image 51 representing group 1 may be displayed in the information on the contents registered in group 1. In this case, the user may select and play one of the contents 3, 4, 8 and 9 displayed in an active state, that is, one of the contents registered in group 1.

Figure 8:
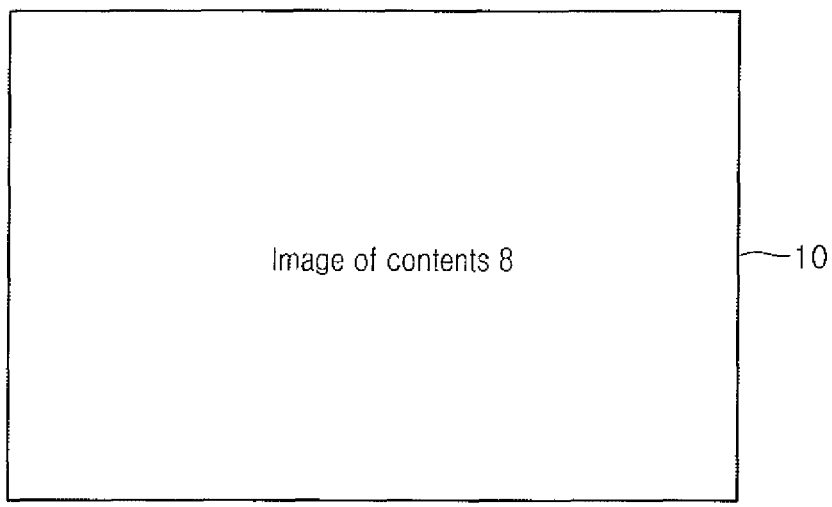
FIG. 8 is a diagram illustrating a method for displaying contents according to an embodiment.

For example, the user may select the eighth contents information 28 displayed on the screen 10, and an image corresponding to the eighth contents may be displayed on the screen 10, as illustrated in FIG. 8. Unlike the illustration of FIG. 7, if the user selects group 1 on the favorite group information window 70, the contents registered in group 1, that is, the contents 3, 4, 8 and 9, may be displayed on the screen 10.

Figure 9:
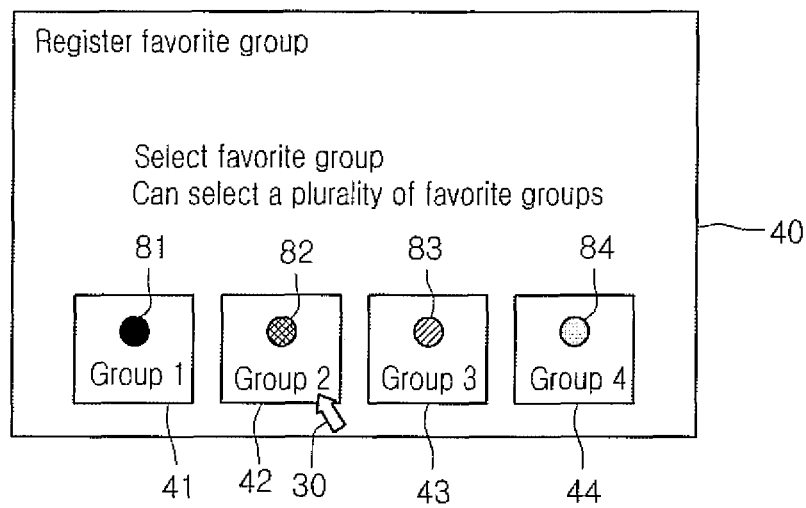
FIG. 9 is a diagram illustrating a method for registering a favorite group for contents according to another embodiment.

FIG. 9 is a diagram illustrating a method for registering a favorite group for contents according to another embodiment. For convenience, description overlapping with the description of FIGS. 1 to 8 has been omitted. Referring to FIG. 9, if the user requests registration of a favorite group for specific contents, a favorite channel registration window 40 including information 41, 42, 43, and 44 on a plurality of favorite groups may be displayed on the screen 10. Images 81, 82, 83 and 84 corresponding respectively to the favorite groups, that is, groups 1 to 4 may be different colors. For example, groups 1, 2, 3 and 4 may correspond, respectively, to yellow, black, red, and blue colors, and the respective favorite groups may be displayed in images of the corresponding colors. The user may select and register group 2 corresponding to a black color as the favorite group for specific contents, for example, the fourth contents.

Figure 10:
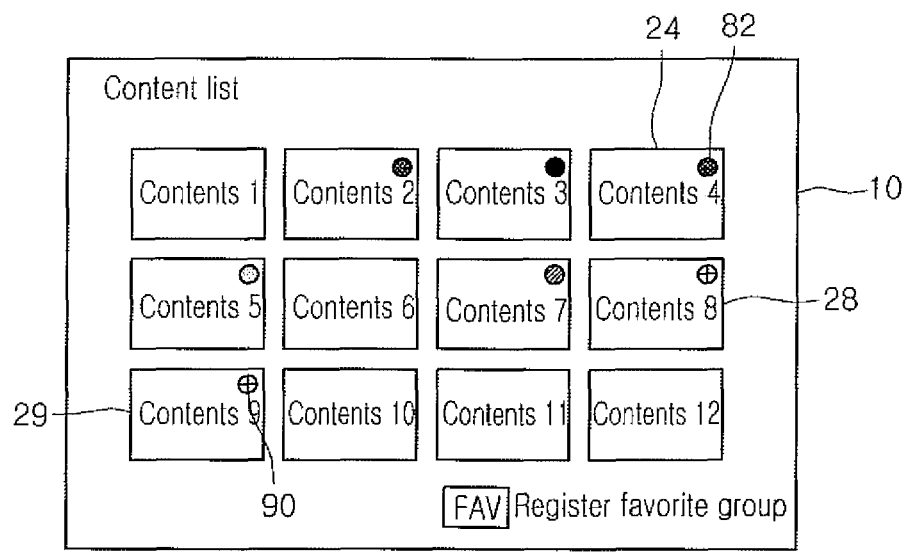
FIGS. 10 to 13 are diagrams illustrating a method for displaying favorite group information on contents according to another embodiment.

Referring to FIG. 10, the fourth contents information 24 may include favorite group information displayed as a black image 82, so that the user may understand that the fourth contents are registered in group 2 corresponding to the black color. From the favorite group information illustrated in FIG. 10, the user may detect, in a visually easy manner, that the second and fourth contents are registered in group 2, the third contents is registered in group 1, the fifth contents is registered in group 4, and the seventh contents is registered in the group 3.

Also, an image 90 may be displayed on the screen 10 to indicate that the contents are registered in a plurality of favorite groups in correspondence with the eighth and ninth contents information 28 and 29 registered in a plurality of favorite groups. From the image 90 included in each of the eighth and ninth contents information 28 and 29, the user may detect that each of the eighth and ninth contents is registered in two or more favorite groups.

The image 90 indicating registration in a plurality of favorite groups may include a plurality of regions that correspond, respectively, to the favorite groups registered with the corresponding contents. Accordingly, from the image 90 displayed in or with the contents information, the user may detect information on two or more favorite groups registered with the corresponding contents.

Figure 11:
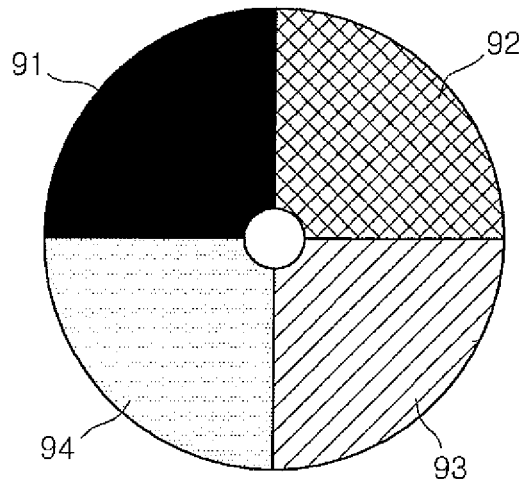

Referring to FIG. 11, the image 90 may include a plurality of regions 91, 92, 93 and 94 corresponding respectively to a plurality of favorite groups, that is, the groups 1 to 4. That is, the first, second, third, and fourth regions 91, 92, 93 and 94 of the image 90 may correspond, respectively, to the groups 1, 2, 3, and 4.

An image corresponding to one of the regions 91, 92, 93 and 94 of the image 90, for example, a region displayed in a specific color, may mean that the corresponding favorite group is registered, and a region without an image (or color) may mean that the corresponding favorite group is not registered. For example, if a color corresponding to group 1 is displayed in the first region 91 of the image 90, it may mean that the corresponding contents are registered in group 1. If a color corresponding to group 2 is not displayed in the second region 92, it may mean that the corresponding contents are not registered in group 2.

Figure 12:
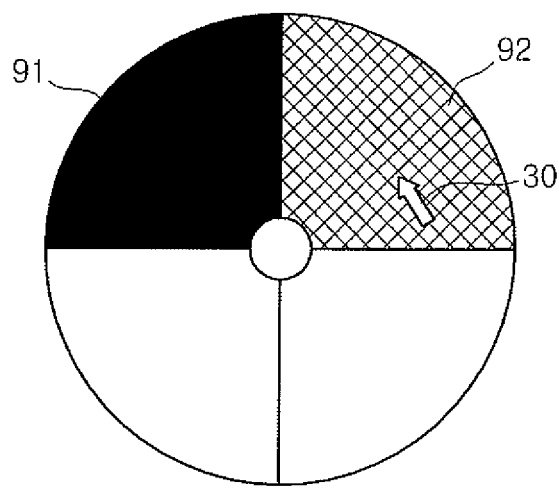

Referring to FIG. 12, because specific colors are displayed in the first and second regions 91 and 92 of the image 90, the displayed image 90 may indicate that the corresponding contents, for example, the ninth contents are registered in groups 1 and 2 corresponding to the first and second regions 91 and 92. Further, because a preset color is not displayed in the third and fourth regions 93 and 94 of the image 90, the displayed image 90 may indicate that the corresponding contents, for example, the ninth contents are not registered in groups 3 and 4 corresponding to the third and fourth regions 93 and 94.

More specifically, if groups 1 to 4 correspond, respectively, to yellow, black, red, and blue colors as described above, the first region 91 of the image 90 illustrated in FIG. 12 may be displayed in a yellow color, the second region 92 may be displayed in a black color, and the third and fourth regions 93 and 94 may be displayed in, for example, a white color without being displayed in red and blue colors.

From the above image 90, the user may detect information on each of the favorite groups registered with the contents, for example, the eighth or ninth contents, registered in a plurality of favorite groups, in a visually easy manner. Also, the user may select one of the regions 91, 92, 93 and 94 displayed in the image 90, to display information on a particular group among the favorite groups, corresponding to the selected region, on the screen 10. For example, the user may select one of the first and second regions 91 and 92 displayed in the image 90, to select one of groups 1 and 2.

Figure 13:
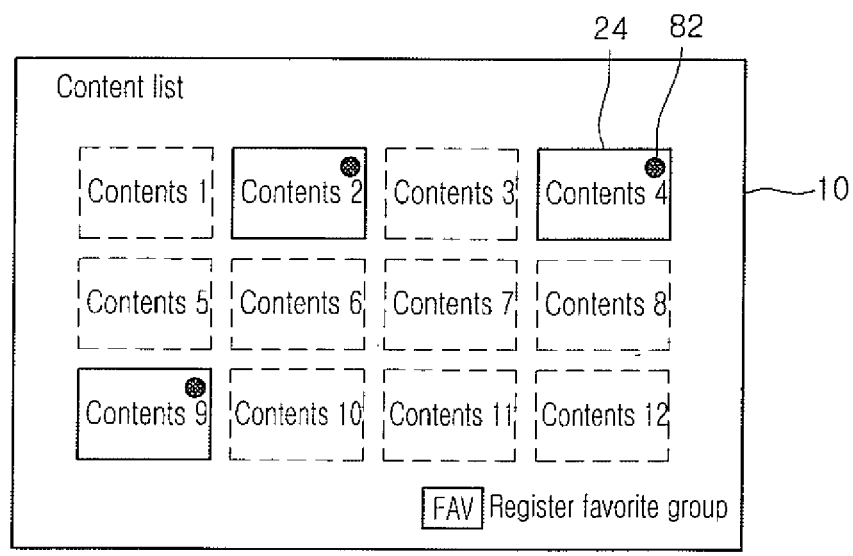

Referring to FIG. 12, the user may select the second region 92 displayed in a black color in the image 90, to select group 2 corresponding to the second region 92 displayed in the black color. In this case, information on the selected group 2, that is, information on the contents registered in group 2, may be displayed on the screen 10 as illustrated in FIG. 13. For example, information on the contents registered in group 2, that is, information corresponding to the second, fourth, and ninth contents, may be display in an active state on the screen 10, and information corresponding to the other contents not registered in group 2 may be display in an inactive state on the screen 10.

Also, an image representing group 2, for example, a black image 82 may be displayed in information on the contents registered in group 2. In this case, the user may select and play one of the contents displayed in an active state, that is, the contents registered in group 2.

Alternatively, unlike the illustration of FIG. 13, if the user selects the second region 92 corresponding to group 2 in the image 90, only information on the contents registered in group 2, that is, information corresponding to the second, fourth, and ninth contents may be displayed on the screen 10. Also, if the user selects the image 90, the image 90 may be displayed in an expanded mode on the screen 10. Accordingly, the user may easily detect information included in the image 90, that is, information on the favorite groups registered with the corresponding contents and may also easily select a specific region of the image 90.

Figure 14:
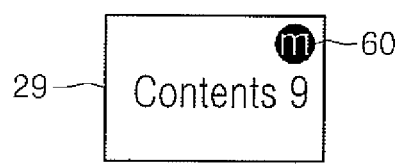
FIGS. 14 and 15 are diagrams illustrating a method for displaying favorite group information on contents according to another embodiment.
Figure 15:
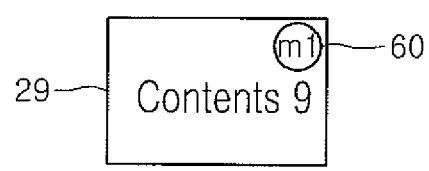

FIGS. 14 and 15 are diagrams illustrating a method for displaying favorite group information on contents according to an embodiment. Referring to FIG. 14, an image 60 indicating registration in a plurality of favorite groups may display information on the group corresponding to a current state of the corresponding contents among the registered favorite groups.

For example, if the ninth contents 29 is registered in groups 1 and 2, the image 60 may be displayed to indicate the ninth contents 29 is registered in a plurality of favorite groups. Also, the displayed image 60 may display which of the registered groups 1 and 2 the current state of the ninth contents 29 corresponds.

The image 60 may display the favorite group(s) corresponding to the current state of the contents by using at least one of a character, a numeral, or a color. For example, the favorite group(s) corresponding to the current state of the contents may be represented by the color of the image 60.

As illustrated in FIG. 14, the image 60 included in the ninth contents information 29 may be represented by an image corresponding to group 1, for example, a yellow image. From the displayed image 60, the user may understand that the ninth contents 29 is registered in a plurality of favorite groups.

If the user selects the image 60 as described above, he may understand that the ninth contents 29 includes detailed information on each of the registered favorite groups. More specifically, if the ninth contents 29 is registered in group 1 (drama) and group 2 (news) and a current type of the ninth contents 29 is drama, a color corresponding to the group 1 (drama), that is, a yellow image 60 may be displayed in the ninth contents information 29.

Referring to FIG. 15, the image 60 may represent the favorite group corresponding to the current state of the corresponding contents in numerals. That is, if the ninth contents 29 is registered in groups 1 and 2 and the current state of the ninth contents 29 corresponds to group 1, the image 60 including a numeral '1' corresponding to group 1 may be displayed in the ninth contents information 29, as illustrated in FIG. 15. Accordingly, in a visually easy manner, the user may detect or recognize that the ninth contents 29 is registered in a plurality of favorite groups and may further recognize that the current ninth contents 29 have characteristics corresponding to group 1.

Figure 16:
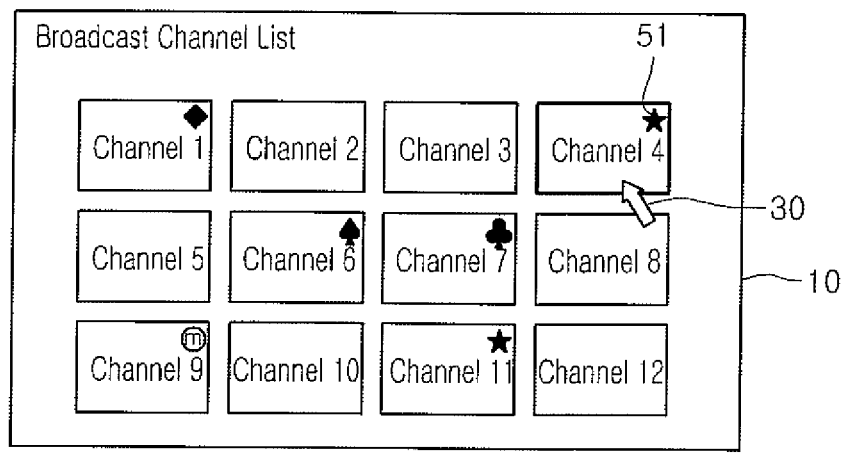
FIG. 16 is a diagram illustrating a method for displaying information on a plurality of broadcast channels according to an embodiment.

FIG. 16 is a diagram illustrating a method for displaying information on a plurality of broadcast channels according to an embodiment. Referring to FIG. 16, information corresponding to receivable broadcast channels, that is, first to twelfth channels may be displayed on a screen 10.

The displayed broadcast channel information may be, for example, a name of a broadcasting station of the channel, a channel number, and a content and tide of contents, which are broadcast on the channel currently or at a specific time slot, in the shape of characters or images. According to one embodiment, the information on the broadcast channels displayed on the screen 10 may be provided by a channel browser, including images, for example, thumbnail images and movie clips, corresponding to videos of the respective broadcast channels.

The user may select one of the information on the broadcast channels displayed on the screen 10, to play the contents of a desired channel. For example, as illustrated in FIG. 16, the user may use an input device to move and position pointer 30 at the information corresponding to a desired channel to select the desired channel.

Figure 17:
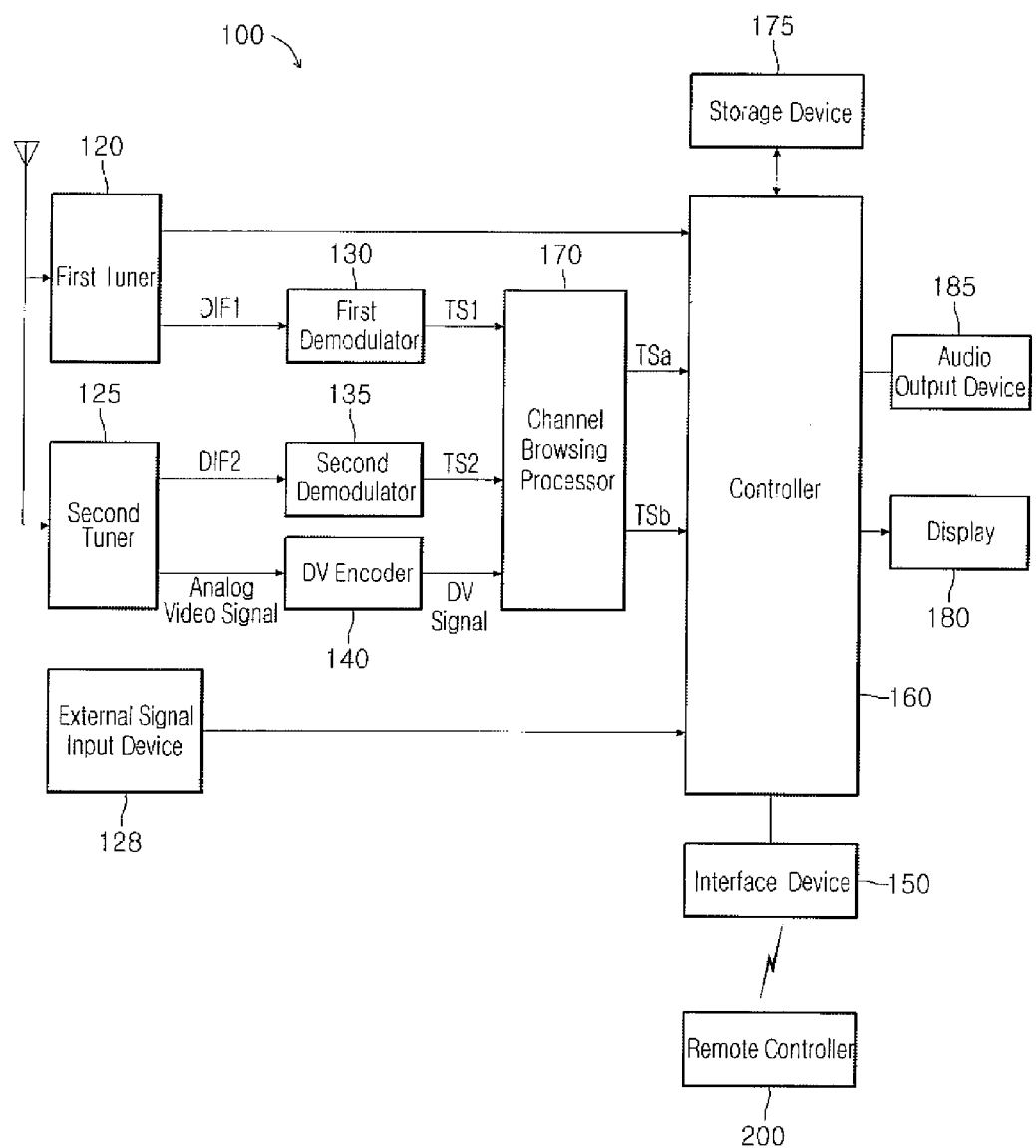
FIG. 17 is a block diagram of a display device according to an embodiment.

FIG. 17 is a block diagram of a display device according to an embodiment. More particularly, FIG. 17 illustrates a contents playing device that performs a contents playing method according to an embodiment. Referring to FIG. 17, a display device 100 may include a first tuner 120, a second tuner 125, an external signal input device 128, a first demodulator 130, a second demodulator 135, an analog-to-digital (AD) converter (or DV encoder) 140, an interface device 150, a controller 160, a channel browsing processor 170, a storage device 175, a display 180, and an audio output device 185.

The first tuner 120 may select a radio frequency (RF) broadcast signal corresponding to a channel selected by a user, among RF broadcast signals received through an antenna, and convert the selected RF broadcast signal into an intermediate frequency (IF) signal or a baseband video/audio signal. For example, if the selected RF broadcast signal is a digital broadcast signal, it may be converted into a digital IF signal DIF1. If the selected RF broadcast signal is an analog broadcast signal, it may be converted into an analog baseband video/audio signal (CVBS1/SIF). That is, the first tuner 120 may be a hybrid tuner that processes a digital broadcast signal and an analog broadcast signal. The analog baseband video/audio signal (CVBS1/SIF) output from the first tuner 120 may also be input directly to the controller 160. The first tuner 120 may also receive an ATSC (Advanced Television Systems Committee) single-carrier RF broadcast signal or a DVB (Digital Video Broadcasting) multi-carrier broadcast signal.

Like the first tuner 120, the second tuner 125 may select a RF broadcast signal corresponding to a channel selected by the user, among the RF broadcast signals received through the antenna, and convert the selected RF broadcast signal into an IF signal or a baseband video/audio signal. The second tuner 125 may sequentially/periodically select RF broadcast signals corresponding to all of the broadcast channels prestored through a channel memory function, among the RF broadcast signals received through the antenna, and convert the selected RF broadcast signals into IF signals or baseband video/audio signals. In one embodiment, because videos of other prestored channels may also be displayed on at least a portion of a screen in a thumbnail format, the RF broadcast signals of all of the prestored channels may be sequentially/periodically received. For example, the first tuner 120 may convert a main RF broadcast signal, selected by the user, into an IF signal or a baseband video/audio signal, and the second tuner 125 may sequentially/periodically select all of the RF broadcast signals (sub RF broadcast signals) except the main RF broadcast signal and convert the selected signals into IF signals or baseband video/audio signals.

The first demodulator 130 may demodulate the digital IF signal DIF1 received from the first tuner 120. For example, if the digital IF signal DIF1 output from the first tuner 120 is an ATSC-based signal, the first demodulator 120 may perform an 8-VSB (8-Vestigal Side Band) demodulation operation. The first demodulator 130 may also perform a channel decoding operation. The first demodulator 130 may include a trellis decoder, a deinterleaver, and a Reed-Solomon decoder to perform a trellis decoding operation, a deinterleaving operation, and a Reed-Solomon decoding operation.

For example, if the digital IF signal DIF1 output from the first tuner 120 is a DVB-based signal, the first demodulator 130 may perform a COFDMA (Coded Orthogonal Frequency Division Multiple Access) demodulation operation. The first demodulator 130 may also perform a channel decoding operation. The first demodulator 130 may include a convolutional decoder, a deinterleaver, and a Reed-Solomon decoder to perform a convolutional decoding operation, a deinterleaving operation, and a Reed-Solomon decoding operation.

The external signal input device 128 may perform a signal input operation with external devices. The external signal input device 128 may include an A/V input/output device and a wireless communication device.

Further, the external signal input device 128 may be connected to one or more external devices, for example, a DVD (Digital Versatile Disk), a Blu-ray, game devices, a camcorder, a computer, and/or a notebook computer, to transfer external input video signals, external input audio signals, and external input data signals to the controller 160 of the display device 100. Also, the external signal input device 128 may output video, audio, and data signals processed by the controller 160 to other external devices. For input/output of video/audio signals with external devices, the A/V input/output device may include an Ethernet terminal, a USB terminal, a CVBS (Composite Video Banking Sync) terminal, a component terminal, S-video terminal (analog), a DVI (Digital Visual Interface) terminal, a HDMI (High Definition Multimedia Interface) terminal, a RGB terminal, a D-SUB terminal, an IEEE 1394 terminal, a SPDIF terminal, and a Liquid HD terminal.

Although not illustrated in the drawings, various input signals input through the external signal input device 128 may be input to the channel browsing processor 170 to perform a thumbnail image extracting operation. For example, analog signals input through the CVBS terminal and the S-video terminal may be converted into digital signals prior to being input to the channel browsing processor 170. Digital signals input through the other input terminals may be input directly to the channel browsing processor 170 without analog/digital conversion. The digital signal output from the external signal input device 128 may be a stream signal, such as a MPEG-2 transport stream (TS) generated by multiplexing a Dolby AC-3 audio signal and a MPEG-2 video signal.

The wireless communication device may perform wireless Internet access. For example, WLAN (Wireless LAN) (Wi-Fi), Wibro (Wireless broadband), Wimax (World Interoperability for Microwave Access), or HSDPA (High Speed Downlink Packet Access) may be used for wireless Internet access. Also, the wireless communication device may perform local wireless communication with other electronic devices. For example, Bluetooth, RFID (Radio Frequency Identification), IrDA (infrared Data Association), UWB (Ultra Wideband), or ZigBee may be used for the local wireless communication.

The external signal input device 128 may also be connected through at least one of the above various terminals to various settop boxes to perform input/output operations with the settop boxes. For example, if the settop box is an IP (Internet Protocol) TV settop box, the external signal input device 128 may transfer video, audio, and data signals processed by the IPTV settop box to the controller 160 and transfer signals processed by the controller 160 to the IPTV settop box.

The video, audio, and data signals processed by the IPTV settop box may also be processed by the controller 160 through the channel browsing processor 170. Depending on the types of transmission networks, examples of the above IPTV may include ADSL-TV, VDSL-TV, and FTTH-TV and may include TV over DSL, Video over DSL, TV over IP (TVIP), and Broadband TV (BTV). Examples of the above IPTV may also include Internet TV and full browsing TV.

The first demodulator 130 may perform a demodulation and channel decoding operation and output a stream signal TS1. The stream signal TS1 may be a signal generated by multiplexing a video signal, an audio signal, and a data signal. For example, the stream signal TS1 may be a MPEG-2 transport stream (TS) generated by multiplexing a MPEG-2 video signal and a Dolby AC-3 audio signal. More specifically, the MPEG-2 TS may include a 4-byte header and a 184-byte payload.

The stream signal TS1 may be input to the controller 160 to be demultiplexed and signal-processed. In one embodiment, prior to being input to the controller 160, the stream signal TS1 may be input to the channel browsing processor 170 to be processed for a channel browsing operation. The channel browsing operation will be described later in more detail.

The first demodulator 130 may be provided as separate devices according to an ATSC mode and a DVB mode. That is, the first demodulator 130 may include an ATSC demodulator and a DVB demodulator.

The second demodulator 135 may demodulate the digital IF signal DIF2 received from the second tuner 125, to output a stream signal TS2. The second demodulator 135 may operate in the same manner as the first demodulator 130, and thus, detailed description thereof has been omitted.

If the signal output from the second tuner 125 is an analog baseband video signal (CVBS2), the signal may be converted into a digital signal by the AD converter 140. The AD converter 140 may convert an input analog signal into a digital signal. If the input signal is a video signal, it may be converted into a digital video signal DV through sampling and quantization. The digital signal may be a non-encoded signal. The digital video signal DV may be input to and processed by the channel browsing processor 170.

The interface device 150 may transfer an input signal from a user to the controller 160 or may transfer a signal from the controller 160 to the user. For example, through various communication schemes, such as a RF communication scheme and an IR communication scheme, the interface device 150 may receive user input signals, such as a power on/off signal, a channel selection signal, and a screen setting signal from the remote controller 200 or may transmit a signal from the controller 160 to the remote controller 200.

The controller 160 may demultiplex an input stream and process the demultiplexed signals to generate and output signals for video/audio output. The controller 160 may control an overall operation of the display device 100.

Although not illustrated in the drawings, the controller 160 may include a de-multiplexer, a video processor, an audio processor, and a user input signal processor. The controller 160 may demultiplex an input stream signal, for example, a MPEG-2 TS signal, into a video signal, an audio signal, and a data signal.

Also, the controller 160 may perform a video process for the demultiplexed video signal. For example, if the demultiplexed video signal is an encoded video signal, it may be decoded. For example, if the demultiplexed video signal is a MPEG-2 encoded video signal, it may be decoded by a MPEG-2 decoder. Also, if the demultiplexed video signal is a DMB-based or DVB-H-based H.264 encoded video signal, it may be decoded by a H.264 decoder.

Also, the controller 160 may control a brightness, tint, and color of the video signal. The video signal processed by the controller 160 may be input to and displayed by the display 180. Also, it may be input to an external output terminal connected to an external output device.

Also, the controller 160 may perform an audio process for the demultiplexed audio signal. For example, if the demultiplexed audio signal is an encoded audio signal, it may be decoded. For example, if the demultiplexed audio signal is a MPEG-2 encoded audio signal, it may be decoded by a MPEG-2 decoder.

Further, if the demultiplexed audio signal is a DMB-based MPEG-4 BSAC (Bit Sliced Arithmetic Coding) encoded audio signal, it may be decoded by a MPEG-4 decoder. Furthermore, if the demultiplexed audio signal is a DMB-based or DVB-H-based MPEG-2 AAC (Advanced Audio Codec) encoded audio signal, it may be decoded by an AAC decoder.

Also, the controller 160 may control a base, treble, and volume of the audio signal. The audio signal processed by the controller 160 may be input to the audio output device 185, for example, a speaker, to be output as sound. Also, it may be input to an external output terminal connected to an external output device.

Also, the controller 160 may perform a data process for the demultiplexed data signal. For example, if the demultiplexed data signal is an encoded data signal, it may be decoded. The encoded data signal may be EPG (Electronic Program Guide) data including broadcast information, such as a start time and an end time of a broadcast program broadcast through each channel.

For example, in the case of an ATSC mode, the EPG information may be TSC-PSIP (ATSC-Program and System Information Protocol) data. In the case of a DVB mode, the EPG information may include DVB-SI (DVB-Service Information) data. The ATSC-PSIP data or the DVB-SI data may be data included in the 4-byte header of the above stream, that is, the MPEG-2 TS.

Also, the controller 160 may perform an OSD (On Screen display) process. More specifically, on the basis of at least one of the video-processed video signal or the data-processed data signal and the user input signal received from the remote controller 200, the controller 160 may generate signals for displaying various data on a screen of the display 180 in, for example, a graphic or text format. The generated signals may be input to the display 180 together with the video-processed video signal and the data-processed data signal. The signals generated for the graphic or text display may include various data, such as icons, widgets, menu screens, and user interface screens of the display device 100.

The channel browsing processor 170 may perform a browsing process for at least one of various input video signals input through the external signal input device 128 and broadcast signals corresponding to received channels. More specifically, the channel browsing processor 170 may receive the demodulated and channel-decoded stream TS1/TS2 from the demodulator 130/135, the stream signal from the external signal input device 128, or the digital signal from the AD converter 140, demultiplex the stream signal TS1/TS2, extract some of the demultiplexed video signals, and perform a multiplexing operation on the basis of video signals, including the extracted video signals to output a new stream signal TSa. For example, the stream signal TSa/TSb may be a MPEG-2 TS signal.

Also, the channel browsing processor 170 may output a main stream signal TSb corresponding to a main video signal displayed on a main screen region, among video signals displayed on the display 180, without performing a separate process, and may perform a channel browsing process on a sub stream signal TSa corresponding to a sub video signal displayed on a sub screen region, among the video signals displayed on the display 180, as described above. In one embodiment, the channel browsing processor 170 may extract some broadcast signal videos of channels and re-encode the same in a stream format, thereby making it possible to display at least some of the broadcast signal videos of the channels on the screen in a thumbnail format when displaying a channel list on the display 180. Accordingly, the user may detect or recognize the contents broadcast on other channels.

The channel browsing processor 170 may extract some of various external input videos input through the external signal input device 128 and re-encode the same in a stream format, thereby making it possible to display at least some of external input videos from external input devices on the screen in a thumbnail format when displaying an external input list on the display 180. Accordingly, the user may detect or recognize the contents input from the external input devices.

Further, the channel browsing processor 170 may extract some of the broadcast channel signal videos and the external input videos and re-encode the same in a stream format, thereby making it possible to display at least some of the broadcast channel signal videos and the external input videos from the external input devices on the screen in a thumbnail format when displaying the channel list and the external input list on the display 180. Accordingly, the user may detect or recognize the contents received through the channels and the external input devices.

The storage device 175 may store a program for control and processing of each signal in the controller 160, and may store signal-processed video signals, audio signals, and data signals. Also, the storage device 175 may temporarily store video, audio, and data signals received from the external signal input device 128. Further, the storage device 175 may store a corresponding broadcast channel through a channel memory function. The storage device 175 may include a storage medium of at least one of a flash memory type, a hard disk type, a multimedia card micro type, a card type memory, for example, SD or XD memory, a RAM or a ROM, for example, an EEPROM.

Although it has been illustrated that the storage device 175 may be provided separately from the controller 160, embodiments are not limited thereto. That is, the storage device 175 may also be provided in the controller 160.

The display device 100 may play files, for example, video files, image files, music files, and text files, stored in the storage device 175, to provide the same to the user. Further, the display 180 may generate a drive signal by converting a video signal, a data signal, and an OSD signal, processed by the controller 160, or a video signal and a data signal, received from the external signal input device 128, into R/G/B signals.

The display 180 may be various types of displays, such as a PDP, a LCD, an OLED, a flexible display, and a three-dimensional (3D) display. Also, the display 180 may be used not only as an output device, but also as an input device by being configured with a touch screen.

The audio output device 185 may receive audio-processed signals, for example, a stereo signal, a 3.1 channel signal, and a 5.1 channel signal, from the controller 160 to output sound. Further, the audio output device 185 may be implemented using various types of speakers.

The remote controller 200 may transmit a user input to the interface device 150. For example, the remote controller 200 may use Bluetooth communication, RF communication, IR communication, UWB communication, or ZigBee communication. Also, the remote controller 200 may receive video signals, audio signals, and data signals from the interface device 150 and output the same.

According to one embodiment, the remote controller 200 may be an input device that makes it possible to perform a user input, for example, an operation of selecting specific contents information, an operation of pressing a button corresponding to a specific function, or an operation of selecting a specific region, as described with reference to FIGS. 1 to 16. That is, the user may use the remote controller 200 to move the pointer 30 displayed on the screen.

Although FIG. 17 illustrates that the display device 100 may include two tuners 120 and 125, embodiments are not limited thereto. That is, the display device 100 may also include one, or three or more tuners.

The display device 100 may be a stationary digital broadcast receiver capable of receiving at least one of an ATSC (8-VSB) digital broadcast, a DVB-T (COFDM) digital broadcast, or an ISDB-T (BST-OFDM) digital broadcast, or may be a mobile digital broadcast receiver capable of receiving at least one of a terrestrial DMB digital broadcast, a satellite DMB digital broadcast, an ADSC-M/H digital broadcast, a DVB-H (COFDM) digital broadcast, or a MediaFLO (Media Forward Link Only) digital broadcast. The display device 100 may also be a cable, satellite, or IPTV digital broadcast receiver.

Figure 18:
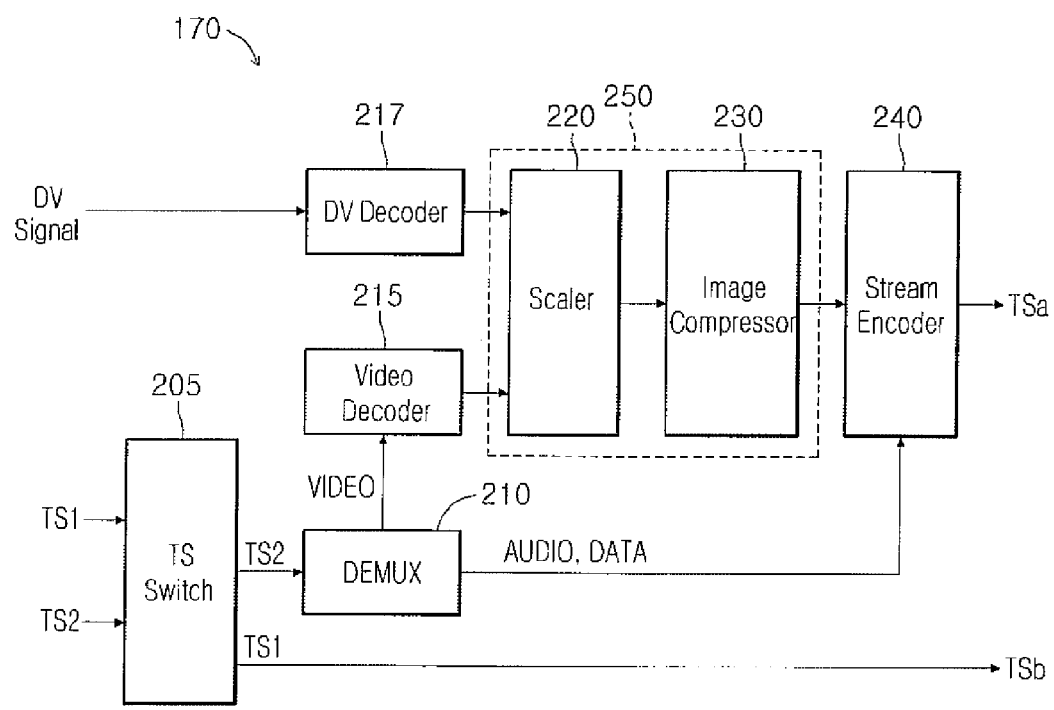
FIG. 18 is a block diagram of a channel browsing processor of FIG. 17.

FIG. 18 is a block diagram of a channel browsing processor 170 illustrated in FIG. 17. Referring to FIG. 18, the channel browsing processor 170 may include a TS switch 205, a demultiplexer (DEMUX) 210, a video decoder 215, a DV decoder 217, a thumbnail generator 250, and a stream encoder 240.

The TS switch 205 may select one of the input streams TS1 and TS2 to output the same as a TS-type main stream TSb without separate conversion into a main stream, and transfer the other one to the demultiplexer 210 to output the same as a TS-type sub stream TSa. A main stream TS1 may correspond to a main video signal and a main broadcast signal, and the main broadcast signal may be displayed on most of the display 180. A sub stream TS2 transferred to the demultiplexer 210 may correspond to a sub video signal except the main channel, and a thumbnail extracted from the sub stream TS2 may be displayed on a partial region of the display 180.

The TS switch 205 may be used to select the TS2 as the main stream and the TS1 as the sub stream. That is, one of the streams input to the TS switch 205 may be selected as the main stream and the other one may be selected as the sub stream.

This operation may be performed in a shortcut view mode for a 'broadcast channel list' that displays a channel list only on a partial region of the display 180, not on the entire region of the display 180. A thumbnail may be extracted from the sub stream input to the demultiplexer 210, and may be displayed in a shortcut view. In addition, the shortcut view mode may also be performed to display an external input list on the display 180. Also, the shortcut view mode may also be performed to display both a channel list and an external input list on the display 180.

The demultiplexer 210 may demultiplex a received stream signal TS1/TS2 into a video signal, an audio signal, and a data signal. The video signal may be transferred to the video decoder 215, and the audio signal and the data signal may be transferred to the stream encoder 240.

The video decoder 215 may extract a picture from the video signal and decode the same. The extracted picture may be an I picture of the video signal or pictures corresponding to some sections of the video signal. The decoding operation may be performed by a MPEG-2, MPEG-4, or H.264 decoder. The DV decoder 217 may receive the digital signal DV from the DV encoder 140 to extract a picture or pictures of some sections.

The thumbnail generator 250 may generate a thumbnail by scaling and compressing the pictures received from the video decoder 215 or the DV decoder 217. A scaler 220 of the thumbnail generator 250 may scale the video signal, received from the video decoder 215 or the DV decoder 217, to control the data amount. For example, a size or resolution of the video signal may be converted. This size conversion may be performed to display the video signal in a suitable size if it is displayed on the display 180 in a thumbnail format. Further, the scaler 220 may convert the input pictures into video signals of different sizes according to a shortcut view of the broadcast channel list and a full view of the broadcast channel list. For example, a size of a video displayed in a thumbnail format in a full view of a video channel list may be greater than a size of that in a shortcut view of the video channel list.

The shortcut view mode and the full view mode may also be performed if the external input list, as well as the channel list, is displayed on the display 180. Also, the shortcut view mode and the full view mode may also be performed if both the external input list and the channel list are simultaneously displayed on the display 180.

An image compressor 230 of the thumbnail generator 250 may encode and compress the video signal converted by the scaler 220. For example, the video converted by the scaler 220 may be encoded by PEG or MPEG-2. The image or the video encoded by the image compressor 230 may be displayed on the display 180 in a thumbnail format.

The stream encoder 240 may packetize and multiplex the video, encoded by the image compressor 230, and the audio and data signals, received from the demultiplexer 210, in a transport stream (TS) format. The packetized transport stream may be a MPEG-2 TS format or may have the same format as the transport stream TS1/TS2 received from the channel browsing processor 170.

According to one embodiment, the channel browsing processor 170 may be used to extract and re-encode at least some of the external input videos and the broadcast signal videos of the channels, so that at least some of the channel broadcast signal videos and the external input videos from the external input devices may be displayed on the screen in a thumbnail format in 'broadcast list view' or 'external input list view'. Accordingly, the user may detect or recognize the contents broadcasted in other channels or the contents received from the external input devices. Further, the channel browsing processor 170 of FIG. 18 may output two output streams TSa and TSb, and may use a SPI (System Packet Interface) if a chip of the controller 160 of FIG. 17 has a structure capable of receiving only one input.

Figure 19:
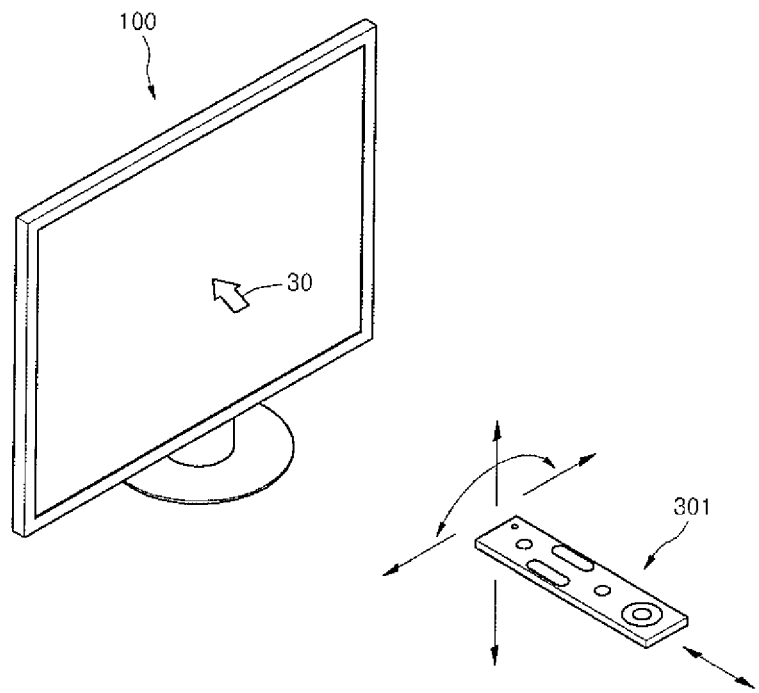
FIGS. 19 and 20 are diagrams illustrating an operation of a remote controller of FIG. 17.
Figure 20:
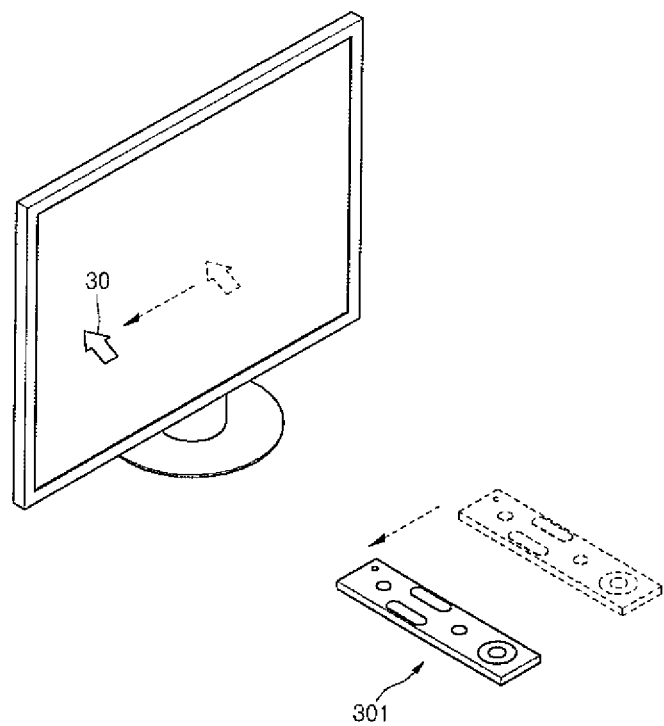

FIGS. 19 and 20 are diagrams illustrating an operation of the remote controller 200 of FIG. 17. According to one embodiment, the remote controller 200 may be a spatial remote controller that detects a motion of the user and provides a signal corresponding to the detected motion to the display device 100. The user may use the spatial remote controller to perform a user input operation described with reference to FIGS. 1 to 16.

Referring to FIG. 19, a spatial remoter controller 301, one example of a user input device capable of inputting commands to the display device 100, may communicate signals with the display device 100 according to the RF communication standard. The display device 100 may display the pointer 30 moving in correspondence with a motion of the spatial remote controller 301. The user may rotate or move the spatial remote controller 301 in up, down, left, right, front, and rear directions, and the pointer 30 displayed on the display device 100 may move in correspondence with the motion of the spatial remote controller 301. As illustrated in FIG. 20, if the user moves the spatial remote controller 301 to the left, the pointer 30 displayed on the display device 100 may move to the left in correspondence with the motion of the spatial remote controller 301.

In one embodiment, the spatial remote controller 301 may include a motion sensor, and information about the motion of the spatial remote controller 301 sensed by the motion sensor may be transmitted to the display device 100. The display device 100 may determine the motion of the spatial remote controller 301 on the basis of the information about the motion of the spatial remote controller 301, and calculate a corresponding coordinate of the pointer 30.

A predetermined command corresponding to the motion of the spatial remote controller 301 may be input to the display device 100. For example, if the spatial remote controller 301 moves in the front or rear directions, a size of an image displayed on the display device 100 may increase or decrease, respectively; however, embodiments are not limited thereto.

Figure 21:
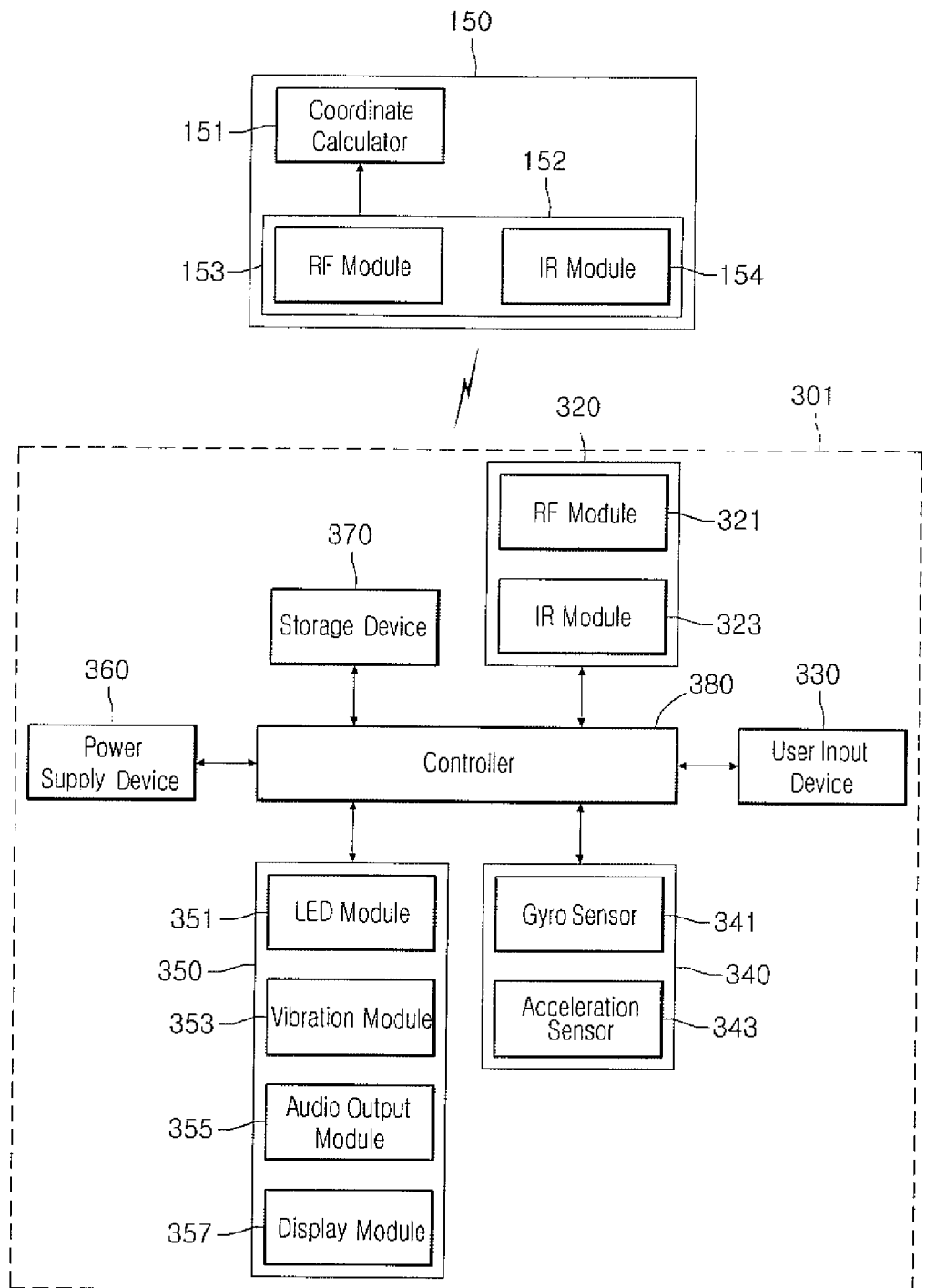
FIG. 21 is a block diagram of a spatial remote controller according to an embodiment.

FIG. 21 is a block diagram of a spatial remote controller according to an embodiment. The spatial remote controller 301 may communicate signals with the interface device 150 illustrated in FIG. 17. Referring to FIG. 21, the spatial remote controller 301 may include a wireless communication device 320, a user input device 330, a sensor 340, an output device 350, a power supply device 360, a storage device 370, and a controller 380.

The wireless communication device 320 may communicate signals with the display device 100. In one embodiment, the spatial remote controller 301 may include an RF module 321 that communicates signals with the interface device 150 of the display device 100 according to the RF communication standard. The spatial remote controller 301 may further include an IR module 323 that communicates signals with the interface device 150 of the display device 100 according to the IR communication standard.

The spatial remote controller 301 may transmit a signal corresponding to the motion of the spatial remote controller 301 to the display device 100 through the RF module 321. Also, the spatial remote controller 301 may receive a signal from the display device 100 through the RF module 321. When necessary, the spatial remote controller 310 may transmit a power on/off command, a channel change command, and a volume change command to the display device 100 through the IR module 323.

The user input device 330 may include keypads or buttons. The user may control the user input device 330 to input commands related to the display device 100 into the spatial remote controller 301.

If the user input device 330 includes a hard key button, the user may push the hard key button to input a command related to the display device 100 into the spatial remote controller 301. On the other hand, if the user input device 330 includes a touchscreen, the user may touch a soft key of the touchscreen to input a command related to the display device 100 into the spatial remote controller 301. The user input device 330 may include various input means, such as a scroll key and a jog key; however, embodiments are not limited thereto.

The sensor 340 may include, for example, a gyro sensor 341 and/or an acceleration sensor 343. The gyro sensor 341 may sense information about the motion of the spatial remote controller 301. For example, the gyro sensor 341 may sense information about the motion of the spatial remote controller 301 with respect to x, y, and z axes.

The acceleration sensor 341 may sense information regarding a moving speed of the spatial remote controller 301. The output device 350 may output video or audio signals corresponding to the control of the user input device 330 or the transmission signal of the display device 100.

The output device 350 may include an LED module 351, which may be turned on and off according to the control of the user input device 330 or a signal about the display device 100 received through the wireless communication device 320, a vibration module 353 that generates vibrations, an audio output module 355 that outputs sound, and a display module 357 that outputs videos.

The power supply device 360 may supply power to the spatial remote controller 301. The power supply device 360 may stop the power supply to the spatial remote controller 301 if the spatial remote controller 301 does not move for a predetermined period of time, thereby reducing a waste of power. The power supply device 360 may resume the power supply if a predetermined key of the spatial remote controller 301 is pressed.

The storage device 370 may store various application data necessary for the control or operation of the spatial remote controller 301. If the spatial remote controller 301 wirelessly communicates signals with the display device 100 through the RF module 321, the spatial remote controller 301 and the display device 100 may communicate signals with each other through a predetermined frequency band.

The controller 380 of the spatial remote controller 301 may store information about a frequency band, which makes it possible to wirelessly communicate signals with the display device 100 paired with the spatial remote controller 301, in the storage device 370 for later reference. Also, the controller 380 may control details related to the control of the spatial remote controller 301. The controller 380 may transmit a signal, corresponding to the control of a predetermined key of the user input device 330, or a signal corresponding to the motion of the spatial remote controller 301 sensed by the sensor 340, to the interface device 310 of the display device 100 through the wireless communication device 320. The interface device 150 may include a wireless communication device 152 that wirelessly communicates signals with the spatial remote controller 301, and a coordinate calculator 315 that calculates a coordinate of the pointer corresponding to the motion of the spatial remote controller 301.

The wireless communication device 152 may wirelessly communicate signals with the spatial remote controller 301 through the RF module 321. Also, the wireless communication device 152 may receive a signal transmitted by the spatial remote controller 301 through the IR module 323.

The coordinate calculator 151 may calculate the coordinates (x,y) of the pointer 30 to be displayed on the display 180, by correcting an error or a shift on the basis of a signal corresponding to the motion of the spatial remote controller 301 received through the wireless communication device 152.

The transmission signal of the spatial remote controller 301 input through the interface device 150 to the display device 100 may be transmitted to the controller 160 of the display device 100. The controller 160 may determine information about a key control or operation of the spatial remote controller 301 on the basis of the transmission signal of the spatial remote controller 301, and control the display device 100 according to the determination results.

Figures 22, 23:
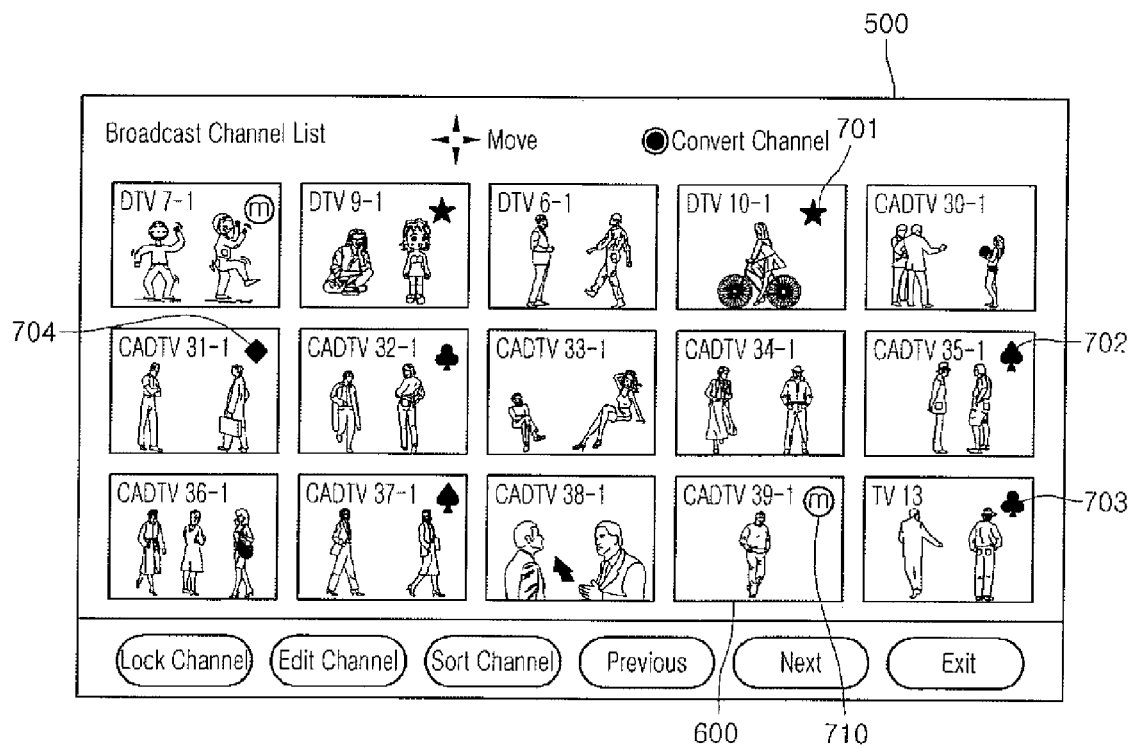
FIG. 22 is a diagram illustrating a method for displaying a favorite group with registered broadcast channels on a channel browser according to an embodiment.
FIG. 23 is a diagram illustrating of an image corresponding to each of favorite groups according to an embodiment.

FIG. 22 is a diagram illustrating a method for displaying a favorite group with registered broadcast channels on a channel browser according to an embodiment. Referring to FIG. 22, a channel browser including thumbnail images corresponding to broadcast channels receivable by the display device 100 may be displayed a screen 500. Because the channel browser may include the thumbnail images corresponding to the broadcast channels, the user may detect or recognize the contents broadcast on the broadcast channels.

The channel browser displayed on the display 180 may further include an edit menu. The edit menu may include a 'lock channel' item for performing a lock function to make it impossible to edit a selected thumbnail image; an 'edit channel' item for editing a selected thumbnail image; a 'sort channel' item for sorting thumbnail images for display; a 'previous' item for displaying the previous thumbnail image except the displayed thumbnail image, a 'next' item for displaying the next thumbnail image except the displayed thumbnail image; and an 'exit' item for moving from the 'image channel list' to another menu item. The thumbnail image displayed in or on the channel browser may be a video or an image, and may be an image of the contents currently received in the corresponding channel or an image of prestored contents. The thumbnail images may be images processed and output by the channel browsing processor 170.

While the channel browser is displayed, if one of the displayed thumbnail images is selected, a broadcast signal video of the channel corresponding to the selected thumbnail image may be displayed on the screen 500. Further, the thumbnail images displayed in or on the channel browser may be sorted according to one of a channel number, a predetermined favorite channel, a recently viewed channel, or a preset deletion channel.

A cursor or a pointer may be displayed on the channel browser. If a user input device, such as the spatial remoter controller 301, is used to provide a movement input for the cursor or the pointer, the cursor or the pointer may move according to the up, down, left, or right moving direction.

Although FIG. 22 illustrates that the channel browser is displayed on the entire screen 500, embodiments are not limited thereto. For example, the channel browser including thumbnail images may be displayed in or on a certain region of the screen 500 while a specific video is displayed on the screen 500.

At least some of the thumbnail images may be updated periodically or randomly, and the update operation may be performed by the channel browsing processor 170. According to one embodiment, as illustrated in FIG. 22, information on favorite groups with registered broadcast channels may be displayed on a channel browser displaying information on broadcast channels, in correspondence with the information on the broadcast channels.

Referring to FIG. 22, images 701 to 704 about favorite groups registered with the corresponding channel may be displayed for at least some of the broadcast channels. That is, a '★' image 701 corresponding to a group 1 may be displayed at or with a 'DTV 10-1' channel registered in group 1, a '♣' image 702 corresponding to a group 2 may be displayed at or with a 'CADTV 35-1' channel registered in group 2, a '♣' image 703 corresponding to a group 3 may be displayed at or with a 'CADTV 32-1' channel registered in group 3, and a '♦' image 704 corresponding to a group 4 may be displayed at or with a 'CADTV 31-1' channel registered in group 4.

Referring to FIG. 23, groups 1 to 4 may be, respectively, a 'drama' group, a 'news' group, a 'game' group, and a 'sports' group, which may be displayed, respectively, as a '★' image 701, a '♣' image 702, a '♣' image 703 and a '♦' image 704. Accordingly, the user may easily understand that the 'DTV 10-1' channel, the 'CADTV 35-1' channel, the 'CADTV 32-1'/'TV 13' channels, and the 'CADTV 31-1' channel provide 'drama' contents, 'news' contents, 'game' contents, and 'sports' contents, respectively.

Also, as illustrated in FIG. 23, the 'drama', 'news', 'game', and 'sports' groups may be displayed in different colors. For example, they may correspond respectively to yellow, black, red, and blue colors.

According to another embodiment, the favorite group information displayed in the channel browser may include information about whether a specific broadcast channel is registered in a plurality of favorite groups. That is, as illustrated in FIG. 22, an additional image 710 may be displayed in channel information 600 of a 'CADTV 39-1' channel to indicate that the 'CADTV 39-1' channel is registered in a plurality of favorite groups.

Figure 24:
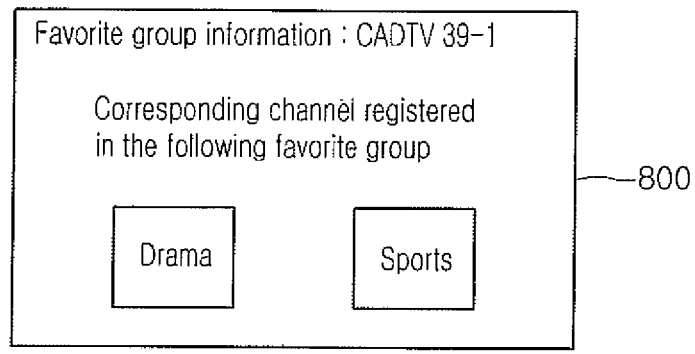
FIG. 24 is a diagram illustrating a method for displaying favorite group information on broadcast channels according to an embodiment.

If the user selects the image 710 displayed in the channel information 600 of the 'CADTV 39-1' channel, information on favorite groups with the 'CADTV 39-1' channel registered may be displayed, as illustrated in FIG. 24. That is, if the 'CADTV 39-1' channel is registered in the 'drama' and 'sports' groups, information on the 'drama' and 'sports' groups registered with the 'CADTV 39-1' channel may be displayed in a channel favorite group information window 800.

Figure 25:
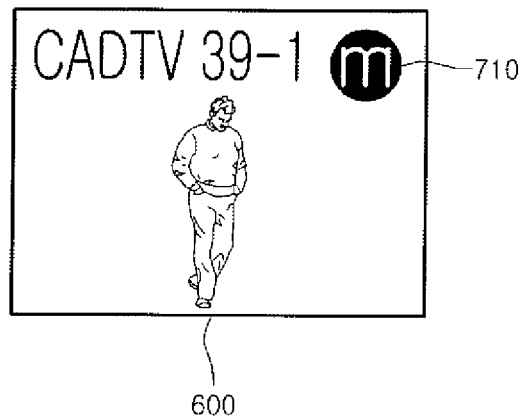
FIGS. 25 and 26 are diagrams illustrating a method for displaying favorite group information on broadcast channels according to an embodiment.
Figure 26:
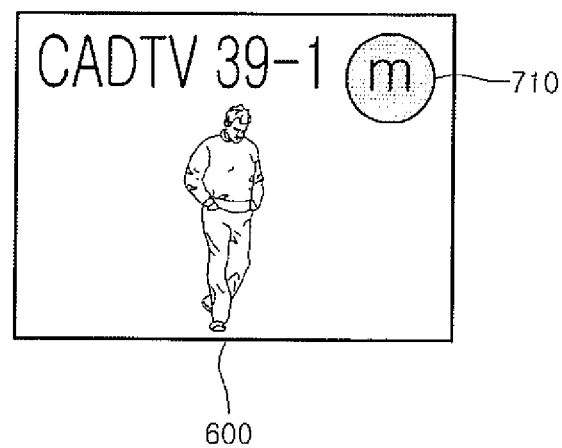

FIGS. 25 and 26 are diagrams illustrating a method for displaying favorite group information on broadcast channels according to another embodiment. Referring to FIG. 25, the image 710 may display information on the group corresponding to the current broadcast contents of the channel among the favorite groups registered with the channel.

For example, the image 710 may display the favorite group corresponding to the current broadcast contents of the channel by using at least one of a character, a numeral or a color. For example, the favorite group corresponding to the current broadcast contents may be represented by the color of the image 710. As illustrated in FIG. 25, the image 710 included in the channel information 600 of the 'CADTV 39-1' channel may be displayed in an image corresponding to the 'drama' group, for example, a yellow image. In this case, the user may understand from the displayed image 710 that the 'CADTV 39-1' channel is registered in a plurality of favorite groups and the current broadcast contents of the 'CADTV 39-1' channel are 'drama' contents. If the user selects the image 710, he may detect detailed information on each of the favorite groups with the 'CADTV 39-1' channel registered.

Referring to FIG. 26, the image 710 included in the channel information 600 of the 'CADTV 39-1' channel may be displayed in an image corresponding to the 'sports' group, for example, a blue image. In this case, the user may understand from the displayed image 710 that the current broadcast contents of the 'CADTV 39-1' channel are 'sports' contents.

FIG. 27 is a diagram illustrating another embodiment of an image corresponding to each of favorite groups according to an embodiment. Referring to FIG. 27, there may be two or more criteria for classifying a plurality of favorite groups.

For example, a plurality of favorite groups may be classified into a 'drama' group, a 'news' group, a 'game' group, and a 'sports' group according to the corresponding contents, that is, a genre of a program provided in a broadcast channel, and the 'drama' group, the 'news' group, the 'game' group, and the 'sports' group may correspond respectively, to a '★' image, a '♣' image, a '♣' image and a '♦' image, respectively. Also, a plurality of favorite groups may be classified into a 'user 1' group, a 'user 2' group, a 'user 3' group, and a 'user 4' group according to users, and the 'user 1' group, the 'user 2' group, the 'user 3' group, and the 'user 4' group may correspond, respectively, to a yellow image, a black image, a red image, and a blue image.

In this case, an image of the favorite group displayed on the screen 500 may include information on two favorite groups simultaneously. For example, if the corresponding broadcast channel is registered in both the 'drama' group and the 'user 2' group, the favorite group image displayed for the broadcast channel may be displayed as a black '★' image.

In addition to the above embodiments, the contents information displaying methods described with reference to FIGS. 2 to 15 may be performed in the channel browser illustrated in FIG. 22.

The above contents information displaying methods according to embodiments may also be embodied as computer-readable codes on a computer-readable recording medium. The computer-readable recording medium may be any data storage device that can store data which can be thereafter read by a computer system. Examples of the computer-readable recording medium may include a read-only memory (ROM), a random-access memory (RAM), a CD-ROM, a magnetic tape, a floppy disk, an optical data storage device, and a carrier wave or waves, such as data transmission through the Internet.

The computer-readable recording medium may also be distributed over network-coupled computer systems so that the computer-readable code may be stored and executed in a distributed fashion. Also, functional programs, codes, and code segments for accomplishing the embodiments may be easily construed by programmers skilled in the art.

Additional details in regard to the thumbnail images and wireless remote may be found in U.S. application Ser. Nos. 12/651,730 filed Jan. 4, 2010, and 12/647,231 filed Dec. 24, 2009, which are hereby incorporated by reference.

According to embodiments, favorite group information on a plurality of contents may be displayed, thereby making it possible to efficiently manage/play various contents input to a display device. Also, if contents are registered in a plurality of favorite groups, information on the favorite groups may be displayed, thus enabling a user to easily detect information on a specific broadcast channel.

Embodiments disclosed herein provide contents information displaying methods that may make it possible to manage/play a plurality of contents efficiently.

According to one embodiment disclosed herein, a method for displaying contents information is provided that may include displaying information on each of a plurality of contents, and displaying an image for a favorite group with the contents registered in correspondence with the displayed contents information. The favorite group image may be displayed in one of a plurality of images, and one of the images may indicate that the contents are registered in two or more favorite groups.

According to another embodiment disclosed herein, a method for displaying contents information is provided that may include displaying information corresponding respectively to a plurality of broadcast channels, and displaying an image for a favorite group with the broadcast channel registered in correspondence with the displayed channel information. The favorite group image may be displayed in one of a plurality of images, and one of the images may indicate that the broadcast channel is registered in two or more favorite groups.

The contents information displaying methods disclosed herein may be embodied as computer-readable codes on a computer-readable recording medium.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for displaying contents information, the method comprising:
displaying, on a screen, information on each of a plurality of broadcast channels on the screen, wherein the information on each of the plurality of broadcast channels includes information on a first broadcast channel and information on a second broadcast channel;
displaying, on the screen, an image associated with one of a plurality of favorite groups in the displayed information for indicating that the broadcast channels are registered to the one of the plurality of favorite groups by a user-input, wherein the plurality of favorite groups correspond to a plurality of colors respectively,
wherein the displaying of the image comprises:
determining a total number of favorite groups that are registered to the broadcast channels,
when the first broadcast channel is registered in one favorite group, displaying a first image corresponding to the favorite group in the information on the first broadcast channel, wherein the first image is displayed in a color representing a favorite group that is registered to the first broadcast channel among the plurality of colors,
when the second broadcast channel is registered in two or more favorite groups, displaying a second image different from the first image in the information on the second broadcast channel, wherein the second image is displayed in a specific color among the plurality of colors, wherein the specific color is a color representing a favorite group corresponding to a current broadcast content of the second broadcast channel among the two or more favorite groups, and
displaying, on the screen, a favorite group information window representing information on the two or more favorite groups registered for the second broadcast channel when the second image is selected, wherein the favorite group information window includes two or more of the first image corresponding to the two or more favorite groups,
receiving a user input to select one of the two or more favorite groups by using the information, on the two or more favorite groups displayed in the favorite group information window, and
displaying information on each of broadcast channels registered in the selected favorite group, from among the plurality of broadcast channels, in an active state, and displaying information on each of broadcast channels not registered in the selected favorite groups, from among the plurality of broadcast channels, in an inactive state.

2. The method according to claim 1, wherein the image comprises one of a symbol or an icon.

3. The method according to claim 1, wherein the image is displayed in different shapes according to the favorite group registered with the broadcast channels.

4. The method according to claim 1, wherein the image is displayed in different colors according to the favorite group registered with the broadcast channels.

5. The method according to claim 4, wherein the color of the image is set to correspond to a color of a button for selection of the favorite group.

6. The method according to claim 1, wherein there are two or more criteria for classifying the plurality of favorite groups, and wherein the image includes information on the criteria of the favorite groups.

7. The method according to claim 1, wherein the second image includes a plurality of regions corresponding; respectively, to the two or more favorite groups registered with the broadcast channels.

8. The method according to claim 7, wherein the plurality of regions included in the second image are displayed in different colors, arid the colors of the regions correspond to the favorite groups, respectively.

9. The method according to claim 7, further comprising:
selecting one of the regions; and
displaying information on the favorite group corresponding to the selected region.

10. The method according to claim 9, wherein the information on the favorite group is information on one or more broadcast channels registered in the favorite group.

11. The method according to claim 10, wherein the second image displays the information on the group corresponding to the current broadcast content of the second broadcast channel by using at least one of a character or a numeral.

12. The method according to claim 1, wherein the favorite groups include at least one of drama, sports, news, movie, video, picture, weather, economy, game, real-time broadcast, or video call.

13. A non-transitory computer-readable recording medium storing a program for executing the method of claim 1 in a computer.

* * * * *